(12) United States Patent
Rogner et al.

(10) Patent No.: US 6,719,115 B2
(45) Date of Patent: Apr. 13, 2004

(54) HYDRAULIC OPERATING ARRANGEMENT FOR CLUTCHES AND THE LIKE

(75) Inventors: Axel Rogner, Höchstadt/Aisch (DE); Manfred Jansen, Weisendorf (DE); Wolfgang Fugel, Nürnberg (DE); Ulrich Helfmeier, Berlin (DE); Ernani Almeida, Sorocaba (BR); Dieter Adler, Herzogenaurach (DE); Uwe Abraham, Recklinghausen (DE); Gerhard Meyer, Lehrberg (DE); Ludwig Winkelmann, Erlangen (DE); Rainer Venz, Weisendorf (DE); Manfred Kraus, Herzogenaurach (DE); Peter Giese, Herzogenaurach (DE); Roland Welter, Bühl (DE); Jean-Francois Heller, Illkirch/Graffenstaden (FR); Volker Lang, Lauf (DE); Wolfgang Sulger, Bühl (DE); Urban Panther, Seelbach (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/087,439

(22) Filed: Feb. 21, 2002

(65) Prior Publication Data

US 2003/0029692 A1 Feb. 13, 2003

Related U.S. Application Data

(63) Continuation of application No. PCT/DE00/02739, filed on Aug. 11, 2000.

(30) Foreign Application Priority Data

Aug. 24, 1999 (DE) .......................................... 199 40 024

(51) Int. Cl.[7] .............................................. F16D 25/08
(52) U.S. Cl. .............................. 192/85 CA; 192/91 A; 192/98; 192/115; 92/128; 92/161; 92/169.1
(58) Field of Search .......................... 192/85 CA, 91 A, 192/98, 70.13, 115; 92/128, 161, 169.1

(56) References Cited

U.S. PATENT DOCUMENTS

| | | | | | |
|---|---|---|---|---|---|
| 4,456,111 A | * | 6/1984 | Limbacher | ............. | 192/85 CA |
| 4,585,106 A | * | 4/1986 | Shirley | ................... | 192/85 CA |
| 4,620,625 A | * | 11/1986 | Ladin | ..................... | 192/85 CA |
| 5,186,297 A | * | 2/1993 | Owada et al. | .......... | 192/85 CA |
| 5,810,145 A | * | 9/1998 | Thomire | ................ | 192/85 CA |
| 5,865,288 A | * | 2/1999 | Thomire et al. | ........ | 192/85 CA |
| 6,345,710 B1 | * | 2/2002 | Welter et al. | ........... | 192/85 CA |

* cited by examiner

Primary Examiner—Saul Rodriguez
(74) Attorney, Agent, or Firm—Darby & Darby

(57) ABSTRACT

The friction clutch between the prime mover and the change-speed transmission in the power train of a motor vehicle is actuatable by a slave cylinder cooperating with a master cylinder wherein the piston is movable by a clutch pedal or by an electric actuator. The casing of the slave cylinder is made, at least in part, of a plastic material and defines a plenum chamber arranged to receive pressurized fluid from the master cylinder by way of a conduit extending through a bell which contains the clutch and the slave cylinder. The annular piston of the slave cylinder surrounds the input shaft of the transmission. The plastic material of the casing of the slave cylinder can contain one or more additives which enhance its strength and/or influence its frictional engagement with the adjacent surfaces of the piston or of a lip seal which reciprocates with the piston. The piston and/or the lip seal can be installed in the casing to contact one or two metallic or plastic guide sleeves which are connected to or form part of the casing.

20 Claims, 12 Drawing Sheets

HYDRAULIC OPERATING ARRANGEMENT FOR CLUTCHES AND THE LIKE

CROSS-REFERENCE TO RELATED CASES

This application is a continuation of international application Serial No. PCT/DEO0/02739, filed Aug. 11, 2000, which is hereby incorporated by reference in its entirety, and claims the priority of the commonly owned German patent application Serial No.19940024.5 filed Aug. 24, 1999. The disclosure of the above-referenced commonly owned copending German patent application, as well as that of each US and foreign patent and patent application identified in the specification of the present application, is incorporated herein by reference.

BACKGROUND OF THE INVENTION

The invention relates to improvements in hydraulic operating arrangements, particularly to operating arrangements for clutches in the power trains of motor vehicles. More particularly, the present invention relates to improvements in hydraulic operating arrangements which can be utilized with advantage in or in combination with so-called master and slave cylinders to actuate friction clutches between the prime movers (such as internal combustion engines) and the change-speed transmissions in the power trains of motor vehicles.

Published German patent application No. 197 42 468 discloses a clutch operating arrangement wherein the housing or casing of the slave cylinder consists, at least in part, of a plastic material. Such slave cylinders are known as central clutch release devices and their casings are normally affixed to the transmission housing or case by threaded fasteners. At least a part of the casing of the slave cylinder is mounted in such a way that it surrounds the input shaft of the change-speed transmission. Securing of the casing of the slave cylinder to the transmission case by threaded fasteners during assembly of the power train is time consuming and hence expensive.

Presently known seals, such as lip seals, which serve to seal the internal chamber of the casing of the slave cylinder from the atmosphere when such chamber is to receive hydraulic fluid from the master cylinder are normally mounted on the reciprocable piston in the slave cylinder of a brake actuator. Such seals share the axial movements of the piston and are called upon to move along inner and outer sealing surfaces which are respectively provided on a metallic and on a plastic material. The sealing surface which is provided on a plastic material normally offers a greater frictional resistance to axial movements of the piston and is likely to generate noise while guiding a piston during actuation (such as disengagement) of the friction clutch.

It is also known to provide the slave cylinder in the hydraulic clutch actuating system of the power train in a motor vehicle with an internal sleeve which serves to guide the piston of the slave cylinder and is made of steel or an equivalent material. A drawback of such slave cylinders is that adequate sealing of the contact surface(s) between the guide sleeve of steel and the plastic casing of the slave cylinder can create serious problems. In order to avoid such problems (including high cost or an unsatisfactory seal), the casings or cylinders of many presently known slave cylinders do not employ separately produced guide sleeves for the piston, i.e., the guide sleeve is part of the plastic casing. A drawback of such proposals is that the making of a slave cylinder casing without a separately produced guide sleeve for the piston but with an adequate guide surface for the piston (i.e., with a guide surface provided on a part made of a plastic material) cannot be made at a reasonable cost in available machines, e.g., in standard injection molding machines for the making of articles from plastic material. As a rule, an injection molding machine which is to turn out such plastic slave cylinder casings must be equipped with highly complex parts such as shifting or pushing arrangements and the like.

OBJECTS OF THE INVENTION

An object of the present invention is to provide a slave cylinder, especially a slave cylinder which can be used as a friction clutch release unit in the power train of a motor vehicle, which does not exhibit the aforediscussed drawbacks of conventional slave cylinders and which exhibits numerous important advantages over such conventional parts or groups of parts.

Another object of our invention is to provide a slave cylinder which can be turned out in large numbers in conventional injection molding and other available machines.

A further object of the invention is to provide a slave cylinder which can be integrated into existing types of power trains without any or without appreciable modifications of such power trains.

An additional object of the invention is to provide a slave cylinder which can be installed within the clutch bell under the hood of a motor vehicle.

An additional object of the invention is to provide a slave cylinder which requires a minimum of maintenance, no inspection or infrequent inspection, and whose useful life is longer than that of presently known slave cylinders for use as a means for actuating friction clutches in the power trains of motor vehicles.

Still another object of the instant invention is to provide a hydraulic clutch actuating system the condition and mode of operation of which can be expected to remain unchanged during the useful life of the motor vehicle.

A further object of the invention is to provide a slave cylinder which can be readily sealed where necessary, wherein the casing is in optimal frictional engagement with the piston, which is not subject to excessive wear, the material of which is not likely to exhibit pronounced fatigue after relatively short periods of use, and which can be made of a wide variety of readily available materials.

Another object of the invention is to provide a hydraulic operating arrangement which employs the above outlined slave cylinder.

A further object of the present invention is to provide novel and improved adapter means for use in the connection between a master cylinder and a slave cylinder in the power train of a motor vehicle.

An additional object of the invention is to provide novel and improved methods of making various component parts of the means for actuating the friction clutch in the power train of a motor vehicle.

Still another object of the invention is to provide novel and improved materials and/or combinations of materials for the making of casings which are to form part of slave cylinders in the power trains of motor vehicles.

A further object of the invention is to provide novel and improved means for ventilating the chambers of cylinders or casings forming part of slave cylinders.

SUMMARY OF THE INVENTION

One feature of the present invention resides in the provision of a system for altering the bias of a clutch spring (such as a diaphragm spring) in and for thus changing the condition of an engageable and disengageable friction clutch between a rotary output element (such as a crankshaft or a camshaft) of a prime mover (such as an internal combustion engine) and a rotary input element of a change-speed transmission preferably having a composite housing or case and being disposed in the power train of a motor vehicle. The improved system includes a primary unit (such as a master cylinder) having an output, means (such as a clutch pedal or an electronic actuator) for actuating the primary unit to thus transmit a pulse by way of the output of the primary unit, a clutch release device having an at least partially plastic composite casing and a mobile bearing coaxial with the input element of the transmission and arranged to alter the bias of the clutch spring in response to movement axially of the input element, means for operatively connecting the output of the primary unit with the clutch release device to move the bearing axially of the input element in response to actuation of the primary unit to transmit a pulse by way of the output, and means for coupling the clutch release device to a component of the transmission housing which is preferably located opposite the bearing.

The means for actuating the primary unit (such as the aforementioned master cylinder) can comprise a driver-operated pedal (clutch pedal) in the motor vehicle.

The coupling means which connects the clutch release device with a component of the transmission housing can include a self-locking arrangement.

The aforementioned master cylinder can constitute a first hydraulic cylinder and piston unit of the improved system, and the aforementioned output can constitute an outlet of the cylinder of the first unit. The casing of the clutch release device can include or constitute the cylinder of a second hydraulic cylinder and piston unit having a mobile piston which is operatively connected with the bearing and is reciprocable in the casing. The actuating means of the improved system can include a conduit which connects the outlet of the cylinder of the first unit with the cylinder of the second unit.

The coupling means of the improved system can comprise complementary first and second coupling members which are form-lockingly connected to each other and are respectively provided on the housing and on the casing. The second coupling member can be of one piece with the casing, and such casing can constitute an injection molded part. The second coupling member can have a shape which is imparted thereto exclusively by injection molding.

It is also possible to employ coupling means which includes at least one snap fastener. The housing of such system is preferably coaxial with the casing and the snap fastener can include at least one hook provided on the housing or on the casing and at least one opening receiving the at least one hook and provided either in the casing or in the housing against axial movement relative to the housing. Alternatively, the at least one snap fastener can comprise an annular array of male fastening elements provided on one of the casing and housing and at least one female fastener provided in the other of the casing and housing and receiving the male fastening elements. The at least one female fastener can include an annular array of openings, at least one for each of the male fastening elements.

The casing of the clutch release device can include a cylinder and this device can further comprise an annular piston which is provided in the cylinder and is arranged to move the bearing relative to the input element (such as a shaft) of the change-speed transmission. The bearing and the piston of such clutch release device surround the input element of the transmission.

Another feature of the present invention resides in the provision of a device which is set up to operate a clutch (such as a friction clutch) between a prime mover and a change-speed transmission in the power train of a motor vehicle. The improved device comprises an axial extension which is provided on the case or housing of the transmission and has a radially inwardly extending circumferetially segmented (subdivided or partitioned) profile, and a casing having an enlarged portion projecting radially outwardly of and overlying (i.e., being surrounded by) at least a portion of and engaging the extension by snap action or an analogous or equivalent action to thus secure the casing to the transmission case as seen axially as well as radially of the extension.

A further feature of our invention resides in the provision of a device for operating a clutch between a prime mover and a change-speed transmission in the power train of a motor vehicle. The device includes an axial extension provided on the transmission case and having a radially extending profile which is provided with a circumferentially extending groove, and a casing having an enlarged portion overlapping or being overlapped by a portion of the extension and engaging the latter by snap action. The engaging means includes at least one fastener which extends into the aforementioned groove of the axial extension of the transmission case.

An additional feature of the instant invention resides in the provision of a device for operating a clutch between the prime mover and the change-speed transmission in the power train of an automobile or another type of motor vehicle. The device comprises an axially enlarged tubular extension provided on the transmission case and having a segmented external profile, and a casing having at least one snap fastener which projects radially inwardly of the extension and engages the external profile to thus secure the casing to the transmission case.

The external profile of the tubular extension can define an annular recess, and the at least one snap fastener extends into the annular recess of the external profile.

The casing of the device includes a portion which is received in the tubular extension, and the aforementioned portion of the casing can further serve as a means for centering the casing relative to the extension.

Another feature of our invention resides in the provision of a device for operating a clutch between a prime mover and a change-speed transmission in the power train of a motor vehicle. The improved clutch operating device comprises a casing including a portion confronting a part of the transmission case, and at least two substantially pin-shaped projections which are provided on the casing and are received in complementary recesses provided therefor in the aforementioned part of the transmission case. The projections have deformable portions extending into the respective recesses and frictonaly engaging the aforementioned part of the transmission case.

The deformable portions extend radially beyond the respective projections and the openings can be dimensioned in such a way that they receive the respective projections with lateral play but effect deformation of deformable portions in response to insertion of the projections into the respective openings so that the deformable portions are self-lockingly retained in the respective openings. The dimensions of the deformable portions (each such deformable portion can include one or more elastic laminations) can decrease in directions as seen into the respective openings.

An advantage of the just described embodiment is that the pin-shaped projections can cooperate with the aforementoned part of the transmission case to hold the casing and the case against axial and angular movement relative to each other. Furthermore, the openings (such as blind holes) can be provided in the casing and the projections are then provided on the transmission case. It is also possible to provide one or more projections on the casing and to further provide one or more projections on the transmission case. The deformable portions can constitute washer-like resilient components which surround the respective pin-shaped projections.

All of the projections may but need not be identical and the radially outer portion of each washer-like deformable portion can be provided with cutouts to facilitate flexing of such deformable portions during insertion into the respective openings.

The just described mode of non-rotatably coupling two parts to each other with simultaneous holding of the parts against axial movement relative to each other can be utilized with advantage in numerous devices or arrangements other than those which serve to releasably couple parts in a clutch actuating device for use in the power trains of motor vehicles.

An additional feature of our invention resides in the provision of a hydraulically actuatable slave cylinder unit for operating a clutch between a prime mover and a change-speed transmission in the power train of a motor vehicle. The improved slave cylinder unit comprises a plastic casing, a guide sleeve which is provided in the casing and surrounds the input shaft of the transmission, an annular piston which is reciprocable in an annular chamber of the casing and surrounds the sleeve, a clutch-operating release bearing which is provided in the chamber and is affixed to the piston, and means for securing the sleeve to the transmission case or to the casing. The means for securing includes a radially outwardly extending flange which is provided at one end of the sleeve and is adjacent the transmission case. The flange has a radially outer portion which is received in a groove of the casing, and the securing means further includes at least one retaining member which is provided in the casing and cooperates with the radially outer portion of the flange to hold the casing and the sleeve against axial movement relative to each other.

The radially outer portion of the flange can include an annular array of extensions which form part of a bayonet mount of the at least one retaining member.

Furthermore, the at least one retaining member can form an integral part of the casing and can be deformed to overlie the radially outer portion of the flange subsequent to insertion of the radially outer portion into the groove.

The at least one retaining member can be deformed as a result of a treatment preferably involving hot caulking or ultrasonic caulking.

The guide sleeve can be received in the casing in stressed condition, and this guide sleeve can cooperate with the casing to jointly define the annular chamber. The improved slave cylinder unit can further comprise at least one sealing element which is interposed between the casing and the sleeve. Such at least one sealing element can constitute an O-ring, a flat seal, a liquid seal or a flow seal. The flow seal can consist of or include a solidified flowable substance which is received in an annular groove of the casing; such solidified flowable substance can consist of or contain silicon rubber or silicon resin. This flow seal can be disposed radially outwardly of the chamber and the casing can be provided with at least one inlet for admission of the flowable substance into its groove. The groove for the flowable substance can have a diameter which slightly exceeds the diameter of the chamber.

The flow seal can have a ring-shaped sealing surface and the casing can be provided with an axially raised sealing surface which surrounds the inlet, which is engaged by the flow seal, and which is in sealing engagement with the radially outer portion of the sleeve.

The slave cylinder unit can further comprise a stop for the release bearing or the piston, and such stop is or can be remote from the aforementioned flange. For example, the stop can be of one piece with the sleeve and can be arranged to prevent disengagement of the piston and of the bearing from the sleeve in storage and/or during transport of the casing, e.g., from the manufacturing plant to the automobile assembly plant.

The stop can constitute a deformed portion of the sleeve; for example, such stop can include at least one substantially radially outwardly extending tongue of the sleeve and such tongue can extend at least substantially circumferentially of the sleeve.

The guide sleeve can consist, at least in part, of a plastic material and the stop can be of one piece with such guide sleeve and/or with the casing.

Another feature of the invention resides in the provision of a hydraulically operated disengaging system for a friction clutch in the power train of a motor vehicle wherein the clutch is installed between a prime mover and a change-speed transmission. The improved system comprises a master cylinder unit, a slave cylinder unit which includes a casing and an annular piston which is reciprocable in an annular plenum chamber of the casing, means for conveying pressurized hydraulic fluid from the master cylinder unit into the plenum chamber, and an annular lip seal provided in the chamber and being slidable relative to cylindrical internal and external surfaces which are provided within the casing radially outwardly and inwardly of the chamber. The casing includes at least one cylindrical metallic sleeve and one of the aforementioned surfaces is provided on the at least one sleeve.

The arrangement can be such that the external surface is provided on the sleeve.

The casing can comprise two cylindrical metallic sleeves one of which is provided with the internal surface and the other of which is provided with the external surface.

The at least one sleeve can consist, at least in part, of aluminum, steel, titanium and/or the alloys of such metals.

Furthermore, the at least one sleeve can include a film which is provided with the at least one surface and serves to reduce the coefficient of friction between the at least one sleeve and the lip seal. The film can contain or consist of grease or of a metal ennobling material.

The at least one sleeve can be provided with a substantially radially outwardly projecting extension and the lip seal is then disposed in the chamber between the piston and the extension. The latter has a sealing surface which abuts a plastic portion of the casing, and such disengaging system can further comprise a second seal which is interposed between the plastic portion of the casing and the extension, a cover which overlies the extension opposite the second seal, and means for securing the cover to the plastic portion of the casing. Such securing means can include an at least substantially annular joint which can be a welded joint, an adhesive joint or a detent.

Still another feature of our invention resides in the provision of a hydraulically operated disengaging system for a friction clutch in the power train of a motor vehicle wherein the clutch is installed to operate between a prime mover and a change-speed transmission. The improved system comprises a master cylinder unit and a slave cylinder unit which latter includes a composite casing consisting at least in part of a plastic material. The slave cylinder unit further includes an anular piston which is reciprocable in an annular plenum chamber of the casing and the latter includes at least two sections which are separable or are separately produced parts to facilitate sealing of the chamber from the atmosphere. Such disengaging system further comprises means for conveying pressurized hydraulic fluid from the master cylinder unit into the annular plenum chamber; the conveying means includes at least one extension provided on the casing.

The extension can include a pipe which is provided with at least one channel for delivery of pressurized fluid from the master cylinder unit into the chamber. The casing can be of one piece with the pipe, and such pipe as well as the casing can consist of a plastic material. The disengaging system can further comprise a bell which confines the friction clutch and the slave cylinder unit. The pipe extends from the master cylinder unit through and into the bell.

The extension can include a nipple and a conduit which is coaxial with and communicatively connects the nipple with the plenum chamber.

The casing can include a wall which is adjacent an end of the chamber and has an opening for the flow of fluid from the conduit into the chamber. This casing can constitute an injection molded product and can be provided with at least one aerating port. Such disengaging system can further comprise means for sealing the at least one port; such sealing means can be secured to the casing by welding, threading, the use of adhesive and/or by latching with the interposition of at least one sealing element between the casing and the sealing means.

A further clutch disengaging system which embodies the present invention comprises a master cylinder unit and a slave cylinder unit including a casing and an annular piston which is reciprocable in an annular plenum chamber of the casing. The casing consists, at least in part, of a plastic material, and the system further includes means for conveying pressurized hydraulic fluid from the master cylinder unit into the chamber and at least one sensor which is associated with the casing and serves to monitor the positions of the piston in the chamber. For example, the sensor can be set up to monitor distances which are covered by the piston in the chamber. Such sensor can be at least partially embedded in the casing, and such casing can constitute an injection molded article. The means for conveying can include a tubular extension of the casing, and such system can further comprise conductor means which is or are embedded in the extension and is or are connected with the at least one sensor.

Another embodiment of the improved hydraulically operated clutch disengaging system comprises a master cylinder unit and a slave cylinder unit which includes a casing and an annular piston slidably reciprocable in an annular chamber of the casing. The casing consists at least in part of a plastic material and contains at least one component which serves to reduce sliding friction with the piston, and the system further comprises means for conveying pressurized hydraulic fluid from the master cylinder unit into the plenum chamber.

The sliding friction reducing component can consist of graphite and/or a polyfluorohydrocarbon; such component can constitute between about 5% and 20%, preferably between 8% and 15% of the material of the casing. A satisfactory casing can contain between about 35% and 75% of a plastic material (such as a thermoplastic or thermosetting substance), between about 20% and 45% of fibers (such as glass fibers which strengthen the casing), and between about 5% and 20% of sliding friction reducing material.

A further embodiment of the improved hydraulically operated clutch disengaging system can comprise a master cylinder unit and a slave cylinder unit which latter includes a casing having an annular plenum chamber, an annular piston reciprocable in the chamber, a first cylindrical surface surrounding the chamber, a second cylindrical surface surrounded by the chamber, and an annular lip seal which is disposed in the chamber, which sealingly engages the two surfaces and which is reciprocable with the piston along and in sealing engagement with predetermined portions of the two surfaces. The slave cylinder further comprises a metallic film provided at least on the predetermined portion of at least one of the surfaces, and the clutch disengaging system further comprises means for conveying pressurized hydraulic fluid from the master cylinder into the plenum chamber.

A further embodiment of the improved clutch disengaging system comprises a master cylinder and a slave cylinder including a casing and a metallic sleeve which is received in and defines with the casing and annular chamber. The sleeve has limited freedom of radial movement relative to the chamber and the slave cylinder further comprises an annular piston which is reciprocally received in the chamber and an annular lip seal which is reciprocable in the chamber with the piston and has an internal surface which sealingly engages the sleeve and an external surface which sealingly engages the casing. The disengaging system further comprises means for conveying pressurized hydraulic fluid from the master cylinder into the annular chamber.

A further fluid-operated clutch actuating system of the present invention comprises a master cylinder, and a slave cylinder including a casing defining a chamber and a piston which is reciprocable in the chamber to thus effect actuation of the clutch. The clutch actuating system further comprises means for conveying fluid between the master cylinder and the chamber of the casing in the slave cylinder. The fluid conveying means comprises an aerating device with at least one sealable port for evacuation of fluid from the chamber.

Another fluid-operated clutch actuating system of the present invention comprises a master cylinder unit and a slave cylinder unit including a preferably plastic casing and a piston which is reciprocable in a chamber of the casing to thus actuate the clutch. The actuating system further comprises means for conveying fluid from the master cylinder unit into the chamber to thus move the piston relative to the casing, and such fluid conveying means includes an adapter which is separably connected with the master cylinder unit and/or with the slave cylinder unit.

The novel features which are considered as characteristic of the invention are set forth in particular in the appended claims. The improved clutch actuating system itself, however, both as to its construction and the modes of assembling, installing and operating the same, together with numerous additional important and advantageous features and attributes thereof, will be best understood upon perusal of the following detailed description of certain presently preferred specific embodiments with reference to the accompanying drawing.

BRIEF DESCRIPTION OF THE DRAWING

FIG. 7 is an axial sectional view analogous to that of FIG. 5 but showing a fifth central clutch release device;

DESCRIPTION OF PREFERRED EMBODIMENTS

Figure 1:
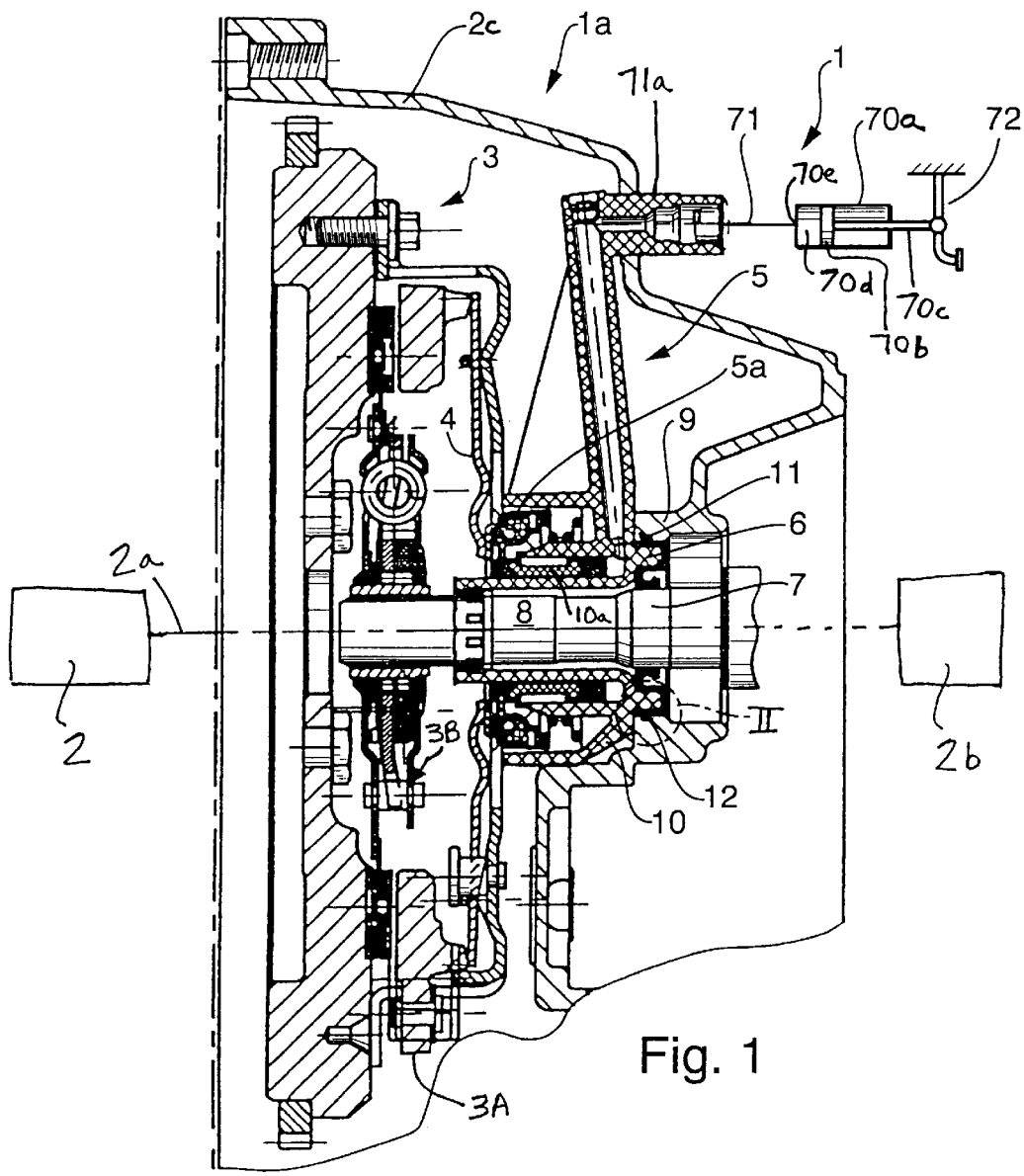
FIG. 1 is a partially schematic and partially sectional view of a power train which is embodied in a motor vehicle and wherein the friction clutch between the prime mover and the change-speed transmission of the power train can be actuated by a hydraulic central clutch release system or device embodying one form of the present invention.

FIG. 1 shows a portion of a power train for use in a motor vehicle, and more particularly a system 1 for altering the bias of a clutch spring 4 (such as a diaphragm spring) and for thus changing the condition of an engageable and disengageable friction clutch 3 between a rotary output element 2a of a prime mover 2 and a rotary input element 8 of a change-speed transmission 2b having a composite housing or case 9 and being disposed in the power train of the motor vehicle. The prime mover 2 can constitute an internal combustion engine or a hybrid motor, and its rotary output element 2a can constitute a camshaft or a crankshaft serving to transmit torque to the input shaft 8 of the change-speed transmission 2b by way of the engageable/disengageable friction clutch 3 which is installed in a stationary outer housing or bell 2c.

The system 1 for altering the bias of the clutch spring 4 includes a primary unit here shown as a master cylinder 70 having a housing or cylinder 70a and a piston 70b which is reciprocable in the housing 70a by a piston rod 70c. The latter is normally maintained in a retracted position (e.g., by a spring or in any other suitable manner) but can be moved forwardly by actuating means here shown as a clutch pedal 72. This causes the piston 70b to expel pressurized hydraulic fluid from a chamber 70d of the housing 70a by way of an outlet or output 70e and into a conduit 71 which connects the master cylinder 70 with a central clutch disengaging or release device 5 here shown as including a slave cylinder having a plastic casing 10, a reciprocable annular piston 10a surrounding the input element 8 of the transmission 2b, and a release bearing 5a borne by the piston 10a. The piston 10a and the release bearing 5a are coaxial with the input shaft 8 of the transmission 2b.

Depending upon the exact nature of the clutch 3 (whether mechanically operated by the operator of the motor vehicle or automated), the mechanical actuating means (pedal) 72 for the piston 70b in the housing 70a of the master cylinder 70 can be replaced with another suitable (other than hydraulic) actuator such as an electric, pneumatic or hybrid actuator. The same applies for the clutch release device 5, i.e., this device can include any suitable centrally located arrangement which can disengage the friction clutch 3 by changing the bias of the clutch spring 4 in response to axial movement of the release bearing 5a.

The central clutch release or disengaging device 5 has an axial extension 6 which is received in an opening 7 of the composite transmission housing or case 9 and surrounds the input shaft 8. A form locking connection 11 between the transmission case 9 and the casing 10 of the central clutch release device 5 is designed to couple the parts 5, 10 together with a self-locking action and includes one or more male components extending into one or more windows, apertures or openings 12 provided in the transmission case 9.

Figure 2:
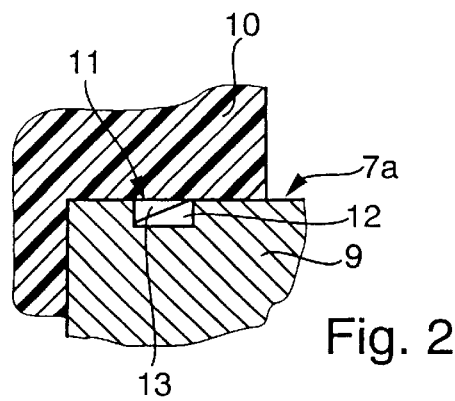
FIG. 2 is an enlarged view of a detail within the phantom-line circle II shown in FIG. 1.

The details of one presently preferred self-locking coupling means 11 are shown in FIG. 2. Such coupling means comprises radially inwardly extending tongues or prongs or arms 13 forming part of or affixed to the plastic casing 10. The number of tongues 13 can vary within a wide range, e.g., between 2 and 8, preferably between 2 and 3, and such tongues are preferably equidistant from each other as seen in the circumferential direction of the transmission case 9. The tongues 13 can be received in the respective openings 12 by snap action. Such openings are provided in an axial extension 7a of the transmission case 9. The form-locking connection is established in response to pushing of the tongues 13 axially of the coaxial shafts 2a and 8 and into the openings 12. It will be appreciated that other types of automatic (self-locking) coupling action can be resorted to for the establishment of a reliable, long-lasting and compact connection between the transmission case and the clutch release bearing 5a.

The character 1a denotes in FIG. 1 an assembly which includes the friction clutch 3 and the hydraulic system 1 and is installed in part within and in part outside of the bell 2a.

Figure 3:
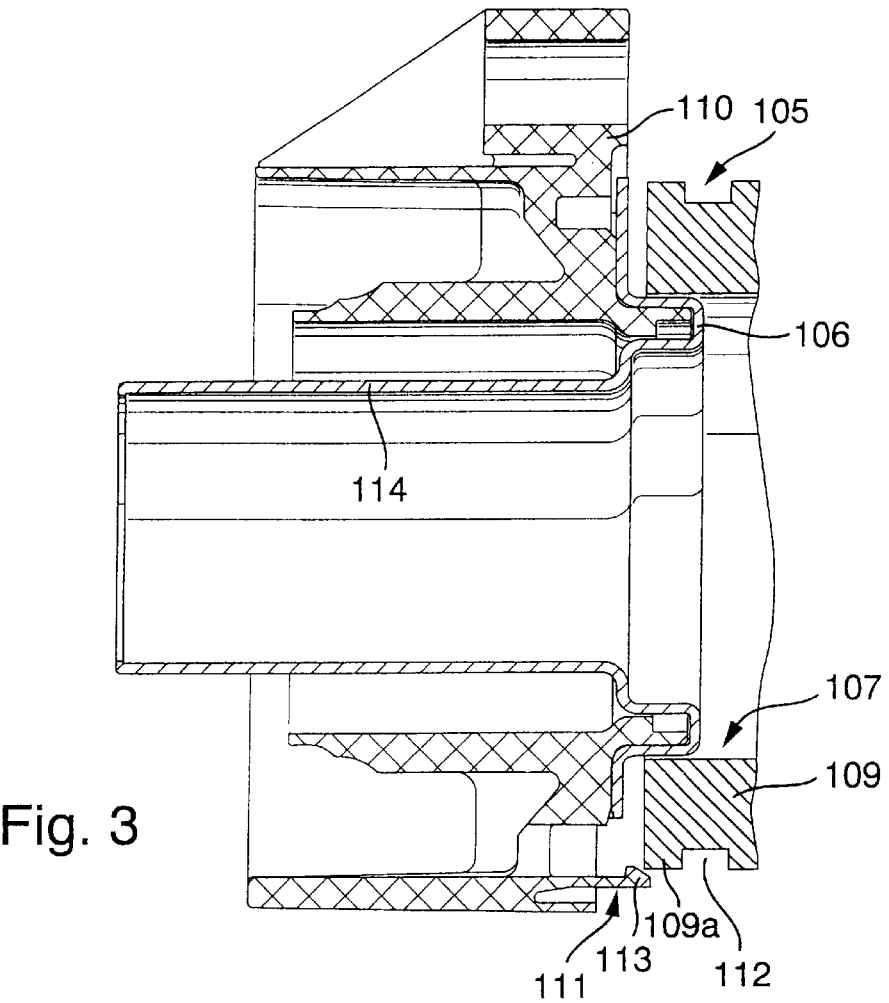
FIG. 3 is an axial sectional view of a portion of a central clutch release system constituting a first modification of that shown in FIG. 1 and an axial sectional view of a first arrangement for securing the clutch release system to the case of a change-speed transmission in the power train of a motor vehicle.

FIG. 3 shows a modified central clutch disengaging or release device 105 having a plastic casing 110 with an axial extension 106 including a deep drawn cylindrical guide sleeve 114 which is form-lockingly connected with the transmission case 109 by extending into an opening 107 of the latter. In order to prevent axial movements of the device 105 relative to the transmission case 109, the structure including the parts shown in FIG. 3 comprises a self-locking connection 111 including a snap fastener having an annular array of first coupling members in the form of hook-shaped projections 113 provided on the casing 110 and extending into second coupling members having openings or apertures 109 machined into or otherwise formed in a collar 109a of the transmission case 109.

Figure 4:
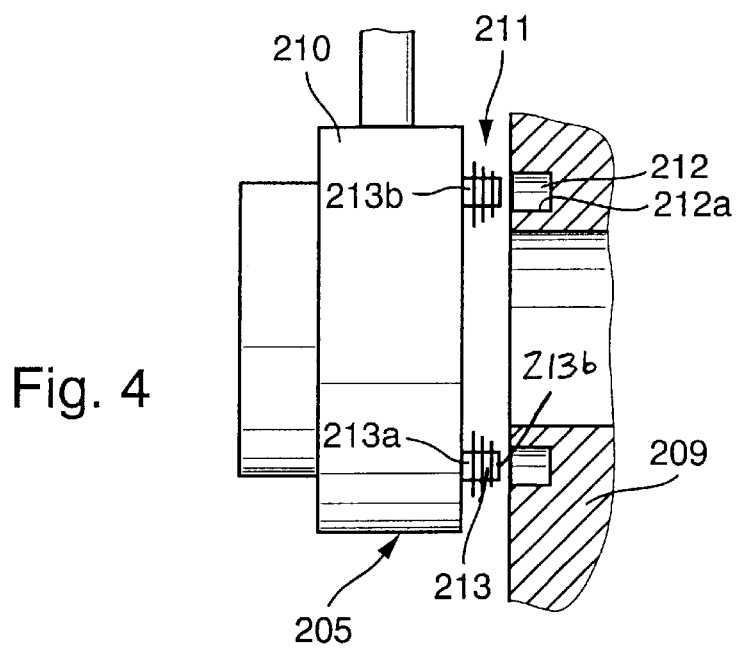
FIG. 4 is an elevational view of a portion of a third central clutch release device and a partly elevational and partly sectional view of a different connection between the transmission case and the clutch release device.

Another self-locking connection 211 between the casing 210 of the clutch release or disengaging device 205 and the transmission case 209 is shown in FIG. 4. The casing 210 has axially parallel pins or studs 213 each of which carries a set of resilient flexible radially outwardly extending laminations 213a which are deformed in response to insertion of pins 213 into complementary openings or recesses or apertures 212 in the adjacent surface of the transmission case 209. The laminations 213a then establish form-locking connections with the surfaces 212a bounding the apertures 212 to thus reliably couple the casing 210 to the transmission case 209. When the self-locking connecting means 211 is operative, the laminations 213a of each set form substantially tubular bodies which at least partially overlie each other and frictionally engage the surfaces 212a surrounding the respective apertures 212. The arrangement can be such that the diameters of the laminations 213a of each set decrease in a direction from the casing 210 toward the tips 213b of the respective pins 213; this facilitates the introduction of pins 213 into the respective apertures 212.

Figure 5:
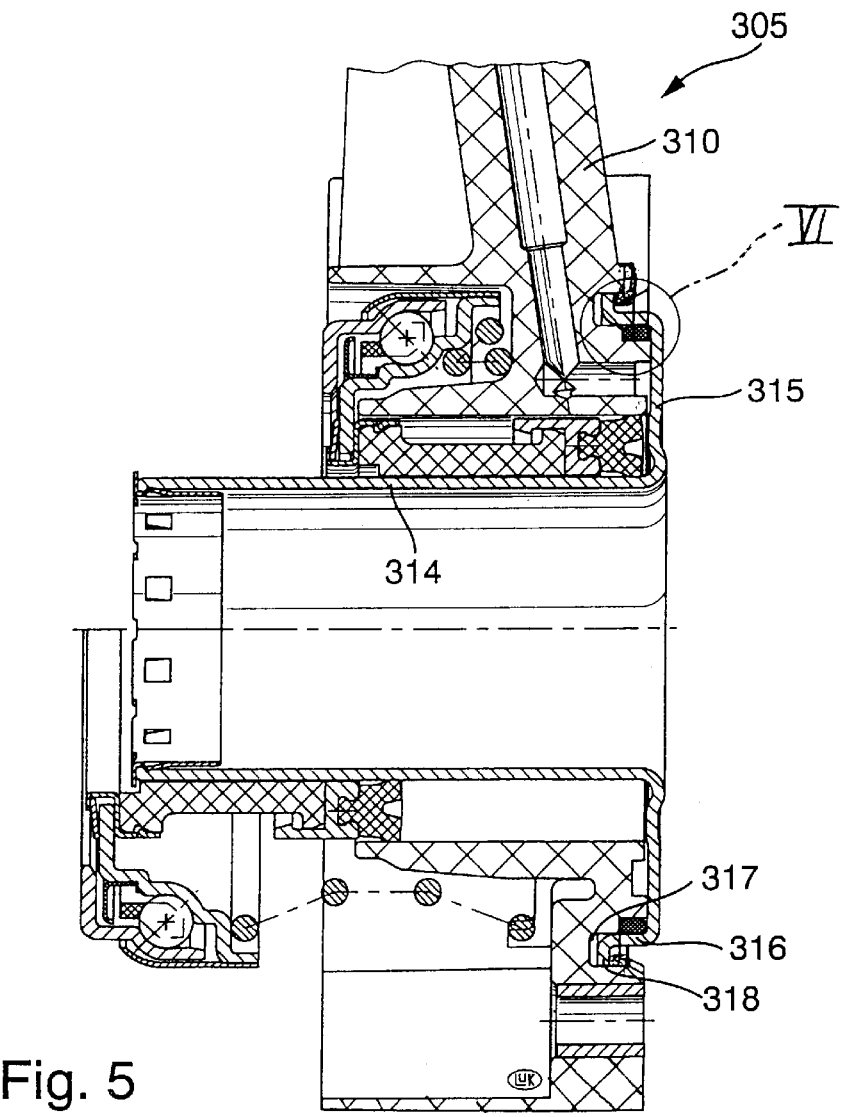
FIG. 5 is a fragmentary axial sectional view of a fourth central clutch release device, the lower part of the piston in the slave cylinder unit in this device being shown in one end position and its upper part being shown in the other end position.

FIG. 5 shows a central clutch release device 305 with a casing 310 which is preferably made of a plastic material and contains a preferably metallic cylindrical guide sleeve 314. For example, the sleeve 314 can be made in a deep drawing machine. That end of the sleeve 314 which is adjacent the transmission is provided with a radially outwardly extending washer-like enlarged portion or flange 315 which, in turn, has an axially extending radially outermost portion 316 (see also FIG. 6). The portion 316 extends toward the engine (not shown in FIG. 5) of the motor vehicle and into a groove 317 of the plastic casing 310 of the clutch release device 305. In order to establish a connection which is effective in the axial direction, the portion 316 has radial extensions 318 which project radially outwardly into segments 318a of the groove 317. Retaining members 320 are provided in the radial segments 318a to hold the respective extensions 318 therein. The retaining members 320 form part of a bayonet mount which holds the guide sleeve 314 and its flange 315 against axial movement relative to the plastic casing 310. The radial segments 318 also form part of the bayonet mount and cooperate with the adjacent retaining members 320 to maintain the bayonet mount in the operative position.

A sealing ring 319 is provided and acts as an annular seat between the radial flange 315 and its radially outermost portion 316 on the one hand, and the plastic casing 310 on the other hand. The retaining members 320 can be embedded into the plastic casing 310 during the making of such casing, e.g., in an injection molding machine. Alternatively, the members 320 can be affixed to the casing 310 by resorting to a plastic processing technique such as hot caulking, ultrasonic caulking or the like. The guide sleeve 314 can be a tight fit in the casing 310 and can be centered in the latter.

Figure 6:
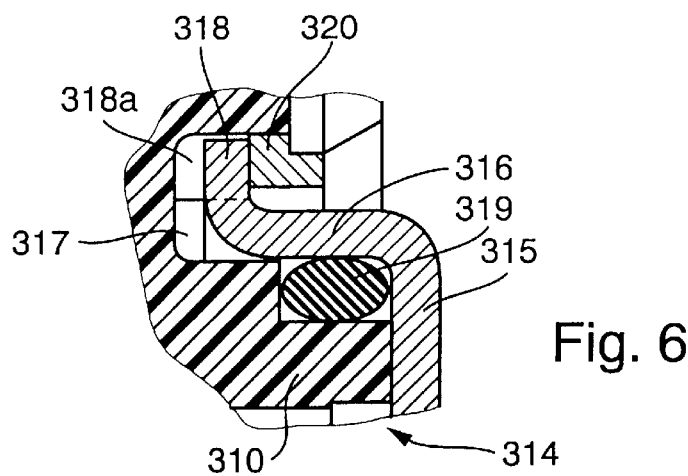
FIG. 6 is an enlarged view of a detail within the phantom-line circle VI shown in FIG. 5.

The connections which are shown in FIGS. 5 and 6 constitute but two examples of connections between the metallic sleeve-like guide 314 and the plastic casing 310. Moreover, the connections which are actually shown in FIGS. 5 and 6 can be utilized jointly with one or more additional connections such as with axially extending fasteners, radially notched nails, standard rivets and/or blind rivets and the like. It is also possible to provide the parts 314 and 310 with mating threads, e.g., by resorting to self-tapping threads. Such self-tapping threads can be employed, for example, to threadedly connect the flange 315 to the casing 310. In addition to or in lieu of such threaded connection, the portion 316 of the flange 315 can be provided with a radially extending threaded portion and/or with radially extending connectors in the form of fasteners.

It is further advisable to provide a tangential connection which secures the guide sleeve 314 to the casing 310 and which can include a tensioning sleeve, not shown. Still further, the groove 317 can receive one or more inserts which serve as reinforcements and/or as retaining means to ensure the establishment of a reliable form-locking connection between the guide sleeve 314 and the casing 320 in addition to or in lieu of the aforedescribed undertakings. It has been found that an ultrasonic welded joint or a hot hammer tightening is particularly suitable to secure the guide sleeve 314 to the casing 310; such joint can be established between the flange 315 or its portion 316 and the casing 310. An advantage of the just discussed undertakings is that one need not resort to a bayonet mount including the parts 318 and 320; all that is necessary is to introduce the portion 316 of the flange 315 into the groove 317 and to secure the portion 316 by ultrasonic welding and/or hot hammering.

Figure 7A:
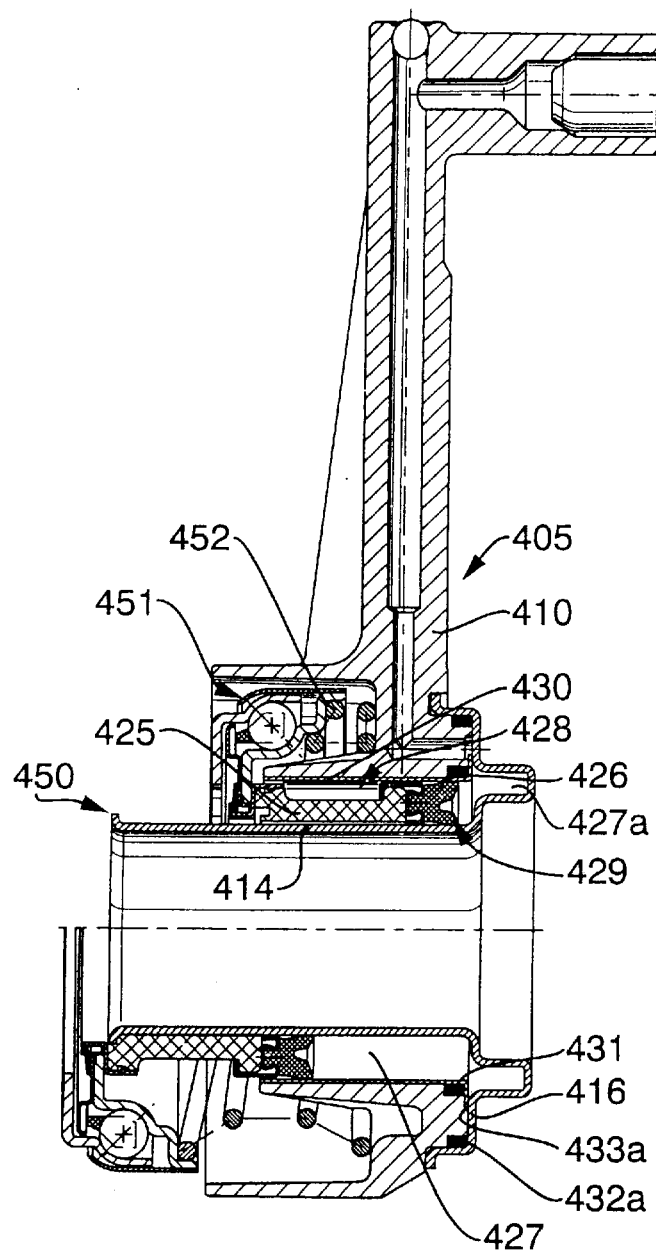
FIG. 7a is an enlarged view of a detail of a guide sleeve constituting a first modification of the guide sleeve in the clutch release device shown in FIG. 7.
Figure 7A:
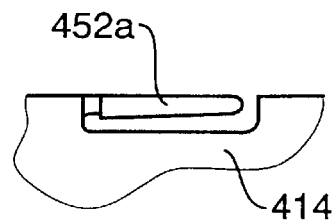
Figure 7B:
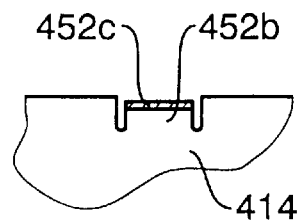
FIG. 7b is a view similar to that of FIG. 7a but showing a second modification of the guide sleeve shown in FIG. 7.

FIG. 7 shows a central clutch release device 405 having a plastic casing 410 and a guide sleeve 414 made of a metallic material, as well as an axially reciprocable annular piston 425 which cooperates with the parts 410, 414 to define an annular chamber 427. The piston 425 carries an annular lip seal 426 with radial and axial play; this lip seal serves to seal the chamber 427. The lower half of the piston 425 is shown in the extended position, and the upper part of this piston is shown in the retracted position.

The lip seal 426 engages a first sealing surface 428 which surrounds the annular chamber 427, and a second sealing surface 429 provided at the exterior of the guide sleeve 414 and being surrounded by the chamber 427. The structure which is shown in FIG. 7 preferably further includes a second metallic guide sleeve 430 which is provided with the first sealing surface 428 and cooperates with the guide sleeve 414 to form a cylinder for the piston 425. The sleeve 430 can be made of aluminum sheet or steel sheet. The provision of the metallic outer guide sleeve 430 is desirable and advantageous because its sealing action with the lip seal 426 is similar or identical to that between the seal 426 and the radially inner guide sleeve 414. It has been ascertained that a sealing action directly between the lip seal 426 and the plastic casing 410 (i.e., the seal which is established between the parts 426 and 410 if the metallic sleeve 430 is omitted) is much inferior to that between the sleeve 430 and the lip seal 426. Inferior sealing action between the lip seal 426 and the plastic casing 410 is attributable to the presence of micropores in the plastic material and the tendency of the seal 426 to adhere to the material of the casing 410.

Furthermore, the utilization of a metallic sleeve 430 renders it possible to dispense with the expensive and time-consuming inspection of the internal surface of the casing 410 for possible presence of micropores and the treatment of such internal surface for the purpose of sealing the micropores (if any). Still further, it is not necessary to effect accelerated setting or hardening of the plastic material of the casing 410 for the purpose of reducing the likelihood of presence of micropores in the surface which is overlapped by the novel metallic sealing sleeve 430.

The sleeve 430 cooperates with a sealing ring 431 to seal the plenum chamber 427 from the surrounding atmosphere. That portion of the sleeve 430 which is adjacent the sealing ring 431 is provided with a radial extension 432a which latter locates it relative to a radial extension 416 of the guide sleeve 414 and a radially extending portion 433a of the casing 410.

The means for supporting and centering the clutch release device 405 includes an extension 427a of the portion 416 at one axial end of the guide sleeve 414. The other axial end of the guide sleeve 414 is provided with a stop 450 for the piston 425. Such stop can be replaced with one or more stops (not shown) for the clutch release bearing 451 which shares the axial movements of the piston 425. The diaphragm spring (shown at 4 in FIG. 1) of the friction clutch 3 urges the pressure plate 3A of the clutch against the clutch disc 3B to thus maintain the clutch in the engaged condition (in which the clutch can transmit torque between the output element 2a of the engine 2 and the input element 8 of the transmission 2b) when the prongs of the diaphragm spring 4 are not depressed by the bearing (such as the bearing 451 shown in FIG. 7). The coil spring 452 of FIG. 7 reacts against the casing 410 of the clutch release device 405 and bears upon the bearing 451 which is connected with the piston 425; this coil spring cooperates with the stop 450 to limit the extent of axial movability of the piston 425 in a direction to the left (as viewed in FIG. 7) before the structure of this Figure is assembled with the friction clutch, i.e., before the bearing 451 can bear upon the tips of prongs of the diaphragm spring. This is desirable during transport of the device 405 to the locale of actual use.

The stop 450 is preferably of one piece with the guide sleeve 414. If the sleeve 414 is made of a metallic material, the stop 450 can constitute one radially outwardly deformed end portion of the metallic tube which is converted into the sleeve 414. Alternatively, and as shown in FIG. 7a, one end portion of the guide sleeve 414 can be provided with one, two or more (e.g., several equidistant) tongues 452a which replace the stop 450 of FIG. 7. The tongue 452a which is shown in FIG. 7a extends circumferentially of the guide sleeve 414. On the other hand, the tongue 452b of FIG. 7b extends axially of the guide sleeve 414. It is advisable to provide the free end of each tongue 452b with at least one radial extension 452c which is axially offset relative to the major part of the guide sleeve 414 to thus contribute to a reduction of axial length (axial space requirements) of the part 452b shown in FIG. 7b.

If the guide sleeve 414 is made of a plastic material and is of one piece with the casing 410 of the clutch release device 405, its tongue(s) or stop(s) 450, 452a or 452b can be made at the time the guide sleeve is being made in an injection molding or other suitable machine. In the event of an inspection, maintenance or replacement, the piston 425 and/or the release bearing 451 can be separated from the casing 410 without necessitating even partial deformation or destruction of such parts. The just described mode of assembling the piston and the release bearing with the casing of the central clutch release device can be resorted to in the power train which employs the structure of FIG. 7, 7a or 7b as well as in many power trains which employ central clutch release devices other than those shown in and described with reference to these Figures.

Figure 8:
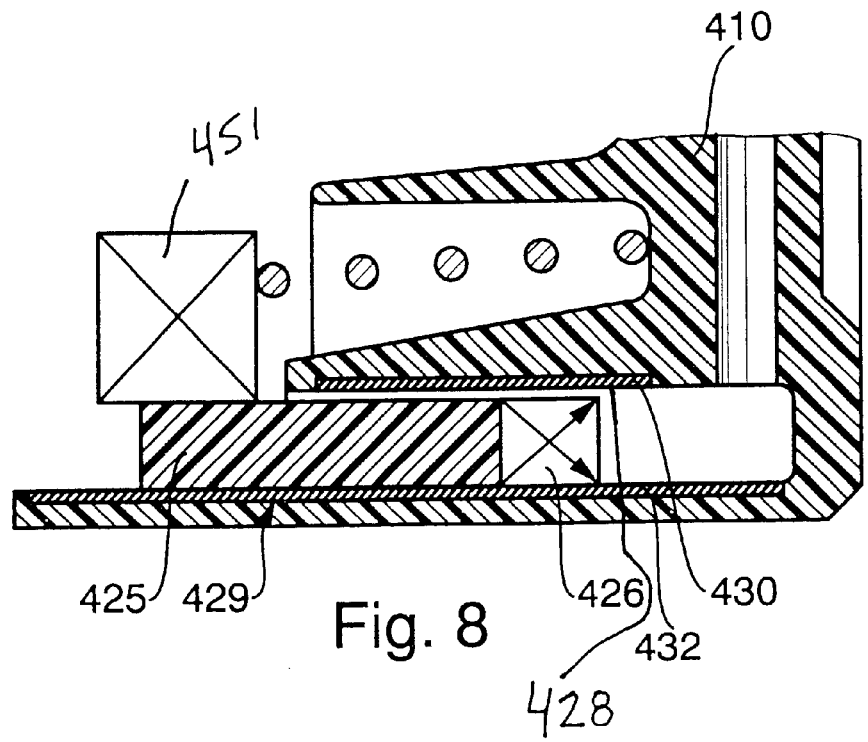
FIG. 8 is a fragmentary axial sectional view of certain parts of a further central clutch release device with one embodiment of guide means for the piston of the slave cylinder unit.

FIG. 8 shows a further embodiment of a sealing sleeve 430 without a radial extension. This sleeve extends essentially along the entire path of axial movement of the lip seal 426 and is or can be recessed radially into the plastic material of the casing 410. Alternatively, the structure of FIG. 8 can comprise a self-locking arrangement (not shown) which can serve as a snap fastener to lock the sleeve 430 to the casing 410. It is of particular advantage to embed the sealing sleeve 430 into the casing 410 already during the making of the latter; a presently preferred undertaking is to make the casing 410, and to simultaneously embed the sleeve 430 therein, in an injection molding machine. In order to establish a desirable sealing action, the sleeve 430 can be glued to the plastic casing 410; in addition to or in lieu of such undertaking, one can employ one or more suitably configurated separately produced sealing elements in the form of rings or the like.

The casing 410 a portion of which is shown in FIG. 8 consists of a suitable synthetic plastic material. Thus, this casing can embody an integral part corresponding to the separately produced metallic guide sleeve 414 of FIG. 7. Such casing can be produced in an injection molding machine. In order to enhance the sealing action at its internal sealing surface 429 which is adjacent the internal surface of the plastic cylindrical piston 425, one can employ a metallic sleeve 432 which is surrounded by the piston 425 as well as by the lip seal 426 and can be made of the same material as the guide sleeve 430 which surrounds the parts 425 and 426.

The casing 410 is made entirely of a suitable synthetic plastic material and can be utilized with or without the sealing sleeve 430 and/or 432. As already mentioned hereinbefore, an injection molding procedure is the presently preferred method or process of making the casing 410 of FIG. 8 as well as the casings shown in FIGS. 1 to 7. However, it is often preferred to utilize the plastic casing 410 in conjunction with at least one of the guide sleeves 430 and 432. The surface 428 of the guide sleeve 430 and/or the surface 429 of the guide sleeve 432 can be readily finished to a degree which is desirable or necessary or indispensable for the establishment of an optimum sealing engagement with the piston 425 and/or with the lip seal 426.

Figure 9:
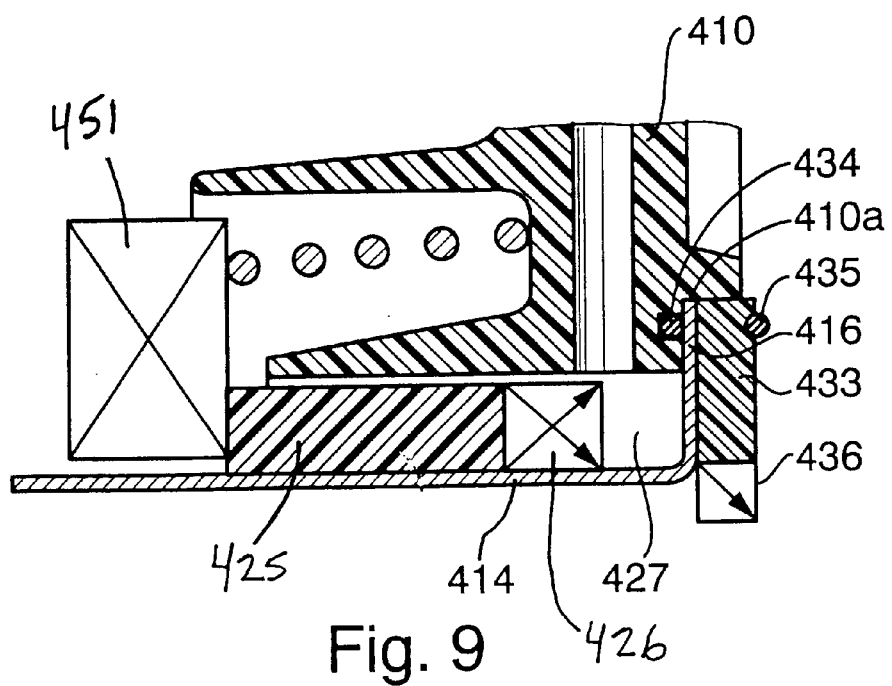
FIG. 9 is a fragmentary axial sectional view of a slave cylinder constituting a modification of that shown in FIG. 8.

FIG. 9 shows a portion of a plastic casing 410 which forms part of a central clutch release device and is connected with a metallic guide sleeve 414 having a radially outwardly extending portion 416 which abuts a shoulder 410a of the casing 410. A cover 434 in the form of a ring serves to hold the sleeve 414 against axial movement in a direction to the left, as viewed in FIG. 9, i.e., against movement relative to the casing 410 and toward the prime mover if the structure shown in FIG. 9 is installed in the power train of a motor vehicle of the character shown (in part diagrammatically and in part in axial sectional view) in FIG. 1.

The plenum chamber 427 which surrounds the metallic sleeve-like guide 414 in the casing 410 is sealed in part by a lip seal 426 and in part by an annular axially acting sealing ring 434 received in a groove of the casing 410 adjacent the inner side of a radially outwardly extending end portion 416 of the guide sleeve 414 at the shoulder 410a. The plate-like cover 433 fully overlies the outer side of the radially outwardly extending stop or cover or extension 416 of the guide sleeve 414 and is secured to the casing 410 against axial movement relative thereto. Furthermore, the cover 433 is fitted into an annular recess at the right-hand end face of the casing 410 against radial movement relative to the casing. The exact mode of connecting the cover 433 to the casing 410 is not critical; for example, one can resort to ultrasonic welding, to hot caulking, an adhesive, ultrasonic caulking, a form-locking procedure such as frictional fitting into each other and/or others.

The embodiments of the casing 410 which are shown in and which were described hereinbefore with reference to FIGS. 8 and 9 exhibit the important advantage that the guide sleeve 430 and/or 432 and/or 414 is not subjected to undesirable and/or excessive tensional stressing, for example, axial stressing relative to the slave cylinder casing 410 and/or vice versa. This, in turn, enhances the stability (sturdiness) of the structure embodying the casing 410 when the hydraulic clutch actuating system is in use.

It is often of advantage to treat the surface(s) of the sleeve 430 and/or 432 shown in FIG. 8 for the purpose of enhancing the tribological characteristics of such sleeve or sleeves and/or to impart such characteristics thereto, i.e., the ability to stand pronounced friction, the ability to undergo satisfactory lubrication and/or the ability to stand extensive and/or pronounced wear upon the surface(s) in relative motion. It has been ascertained that guide sleeves 430 and/or 432 which are made of steel can enhance the rigidity of the entire casing 410 and/or of the combination(s) of parts including such casing.

If the plastic casing 410 of FIG. 9 is self-lockingly coupled with the guide sleeve 414 already during assembly of the clutch releasing or disengaging system, and if the plate-like cover 433 of FIG. 9 is installed with requisite play relative to the radial extension or stop 416 so that it abuts the transmission case (not shown in FIGS. 8 and 9), one can avoid an indirect or direct contact between the guide sleeve 414 and the transmission case. In order to further damp the contact between the plate-like cover 433 and the case of the change-speed transmission 2b, the structure of FIG. 9 uses the sealing ring 435. An undulate sealing ring 436 (shown in FIG. 9), such as a suitable annular shaft seal, can be provided to surround the input shaft of the change-speed transmission (see the shaft 8 in the embodiment of FIG. 1). The shaft seal can be held in proper position by snap action and can be made of a suitable plastic material as a sandwich structure, as a composite seal or in many other suitable ways.

Figure 10:
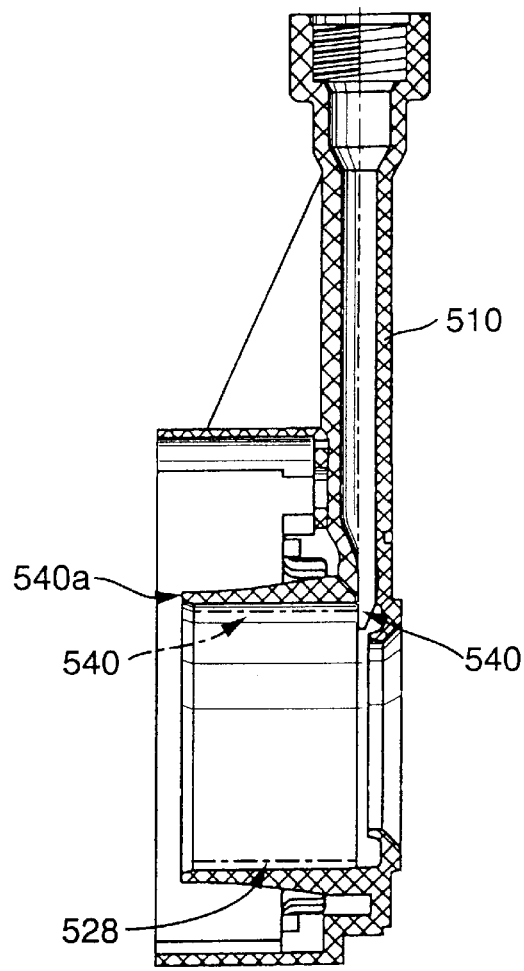
FIG. 10 is an axial sectional view of the casing of a further central clutch release system.

FIG. 10 illustrates a preferably plastic casing 510 for use in a central clutch disengaging or release device and surrounds a cylindrical guide sleeve (not shown) to define therewith an annular plenum chamber for a reciprocable annular piston connected to a release bearing, e.g., in a manner as shown in FIG. 5 or 7. The annular plenum chamber is surrounded by a cylindrical sealing surface 528 of the casing 510. The surface 528 is engaged by a lip seal, e.g., a lip seal of the type shown at 426 in FIG. 7, which seals the plenum chamber radially outwardly.

In order to enhance the sealing action, the surfaces can be coated with a film of metallic material, e.g., in a manner as proposed in published German patent application No. 43 31 728. This publication proposes the application of a coat of nickel, namely chemical nickel coating in accordance with the autocatalytic technique. When applied in conjunction with the structure shown in FIG. 10, the film or coat 540 is limited to that portion of the internal surface of the casing 510 which is in contact with the lip seal while the latter moves axially between its two end positions. An advantage of limited coating with a film of metallic material is that it entails substantial savings in such material and hence a reduction of cost of the entire clutch actuating arrangement.

A minimizing of the application of nickel or other suitable metallic material to the surface or surfaces coming into actual contact with the lip seal is desirable and advantageous on the additional ground that this reduces the likelihood of contact between human skin and the applied metallic layer; such contact could result in damage to the skin and the likelihood of such contact is greatly reduced if the coating is limited to operations in a manner and in the regions as pointed out hereinbefore. Another suitable undertaking is zinc phosphating of that portion of the surface of the casing 510 which comes in contact with the lip seal.

A suitable method which can be resorted to in connection with metal coating one or more selected portions of the casing 510 is to stack a plurality of such casings axially next to each other (such as on top of each other) and to thereupon equalize the intermediate regions at 540a, 540b with spacing elements in the form of rings. The rings simultaneously serve to respectively fix and seal the neighboring casings relative to and from each other. This results in the establishment of a column of superimposed (aligned) casings and rings which preferably define an upright cylindrical space ready to be thereupon filled with liquefied metal-containing material serving to provide the desired metallic film on those portions of the superimposed casings which are to be contacted by the Lip seals in actual use of the casings.

FIGS. 11 to 13a illustrate several embodiments of pistons (427a, b, c and d) corresponding to (i.e., serving the same purpose as) the piston 425 in the structure shown in FIG. 7. As a rule, such pistons are made of fiber-reinforced synthetic plastic materials, e.g., in an injection molding machine. In the absence of armoring with films of a metallic material, plastic pistons are likely to chock (wedge or block or jam) when in contact with a sealing surface (such as the sealing surface shown at 428 in FIG. 7).

In order to enhance the slidability of a plastic piston along a sealing surface (such as of the piston 425 along the sealing surface 428 shown in FIG. 7), it is advisable to incorporate (compound) into the plastic material of the casing 410 one or more suitable slidability enhancing substances, such as graphite and/or PDFE, which are admitted into the plastic material prior to the carrying out of the injection molding operation. For example, the plastic material of the casing 410 shown in FIG. 7 can contain not less than 10% graphite and then preferably contains less than the usual percentage (between 35% and 45%) of reinforcing fibrous material. Alternatively, the omitted percentage of standard reinforcing material can be replaced with mineral fibers. The basic material of the casing 410 is or can be a thermoplastic substance (such as PA (polyamide), PPA, PPS, PBT (polybutylene ephtalate) or the like) or a thermosetting substance (e.g., a phenolic resin). It has been ascertained that a satisfactory plastic material has an expansion coefficient not or not appreciably affected by temperature changes; for example, the glass temperature $T_G$ is above 100° C.

In addition to the above enumerated and discussed alternatives and modifications regarding its composition, the piston of the improved slave cylinder unit whose cylinder or housing includes the casing, such as the casing 510, can assume any one of a host of various shapes four of which are shown in FIGS. 11, 12, 13 and 13a. The piston 427b of FIG. 12 has end faces 450a, 450b at least one of which (see the right-hand end face) is profiled at 450b'. The illustrated profile is a rather pronounced bevel or facet; however, such profile need not be exactly flat but can have a convex, undulate or any other suitable shape which enhances a particular characteristic (such as slidability) of the piston.

Figure 12:
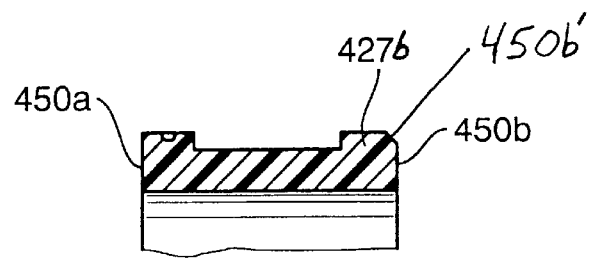
FIG. 12 is a similar fragmentary axial sectional view of a further piston.
Figure 13:
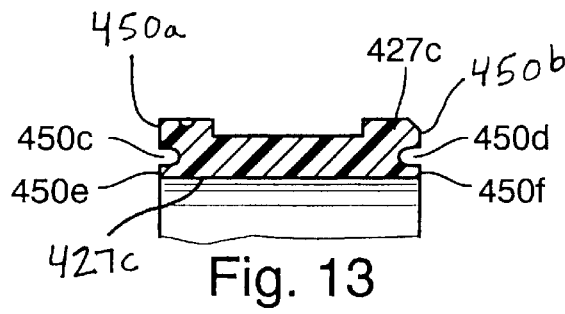
FIG. 13 is a similar fragmentary axial sectional view of an additional piston.

The piston 427c of FIG. 13 exhibits all features of the piston 427b shown in FIG. 12 and its end faces 450a, 450b are respectively provided with circumferentially complete or interrupted annular or arcuate relief notches, grooves or recesses 450c, 450d surrounding annular portions 450e, 450f which enhance the radial elasticity or yieldability of the respective parts of the piston 427c at its cylindrical internal surface 427c'. One of the recesses 450c, 450d can be omitted or one of the end faces 450a, 450b can be provided with two or more circumferentially complete or arcuate grooves which can be short, very short, relatively long or very long. The numbers, the dimensions and/or the configurations of the recesses 450c, 450d will determine the elasticities and/or other desirable characteristics of the corresponding portions 450e, 450f of the piston 427c. As a rule, greater elasticity of the piston at its end faces (especially close to its internal surface 427c') reduces the likelihood of undesirable disfiguration and resulting jamming of the piston in the cylinder or housing of the slave cylinder unit.

The piston 427c of FIG. 13 is not or need not be considered as having been drawn to scale. For example, the width of the annular portion 450e and/or 450f need not exceed and can be less than 1 mm (as measured radially of the piston 427c), as long as such annular portions satisfy their intended purpose of reducing the likelihood of jamming of the piston 427c in the cylinder.

Figure 11:
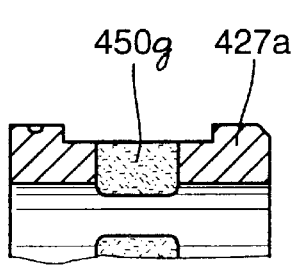
FIG. 11 is a fragmentary axial sectional view of a modified annular piston for use in the central clutch release system of the present invention.

The substantially cylindrical piston 427a which is shown in FIG. 11 is provided with several (e.g., with an annular array of) preferably but not necessarily equidistant pockets 450g each of which can constitute a storage facility or reservoir for a lubricant (e.g., grease). Such lubricant is automatically distributed along the external and on the internal surface of the piston 427a when the latter is caused or permitted to move along the surface(s) of the adjacent part or parts, for example, part(s) consisting at least in part of a synthetic plastic material. It is often sufficient to replace the illustrated through pockets 450g with relatively shallow or relatively deep "blind" pockets which are provided in the internal or in the external surface of the piston 427a. The making of pockets which extend radially of and all the way through the piston 427a is often preferred for convenience of manufacture.

It is also within the purview of the present invention to confine in one, more or all pockets 450g bodies of sponge-like material which serves to reliably hold lubricant in the respective pockets and/or to confine in the respective pockets a lubricant having a relatively low viscosity, i.e., a lubricant which, in the absence of sponge-like foraminous fillers, would be unlikely to dwell in the pockets. It is also possible to provide the piston 427a with one or more covers or lids (not shown) serving to overlie the radially outer or inner end or ends (normally the outer end or ends) of the respective pocket(s) 450g. Still further, it is possible to provide the piston 427a with at least one pocket having an open radially outer end and with at least one pocket having a closed radially inner end; for example, the piston 427a can have at least one annular array of pockets with open radially inner ends and at least one annular array of pockets with open radially outer ends. In accordance with a presently preferred embodiment, the piston 427a can be provided with at least one annular array of preferably equidistant pockets which are open at their radially inner and radially outer ends and each of which contains a piece of sponge permeated with a mass of lubricant; such piston further carries closures (such as flaps of sheet-like material) which overlie and seal the radially outer ends of the pockets and are bonded or otherwise reliably (removably or more or less permanently) affixed to the piston.

Figure 13A:
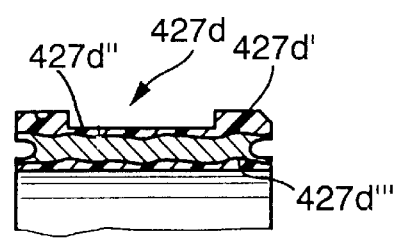
FIG. 13a is a fragmentary axial sectional view of a piston constituting a modification of that shown in FIG. 13.

FIG. 13a shows a portion of an annular piston 427d which is produced in accordance with the so-called mono sandwich process. Thus, this piston has a core 427d' consisting of a high-stability plastic material such as a thermoplastic or thermosetting synthetic plastic substance which can be reinforced, e.g., with glass fibers. The radially outer and inner portions 427d', 427d''' of the piston 427d can be made of a plastic material which exhibits a high coefficient of friction and/or a high surface quality or finish, for example, a polymer of a fluorocarbon such as PTFE, PFA, PVDF, non-reinforced plastic materials which can contain slip additives (antiseize agents) such as graphite, PTFE and the like. Such design and composition of the piston 427a ensure that the coefficient of friction between the piston and the casing of the central clutch disengaging or release device will be more satisfactory than in the absence of such additives, i.e., that the piston will offer a lesser resistance to sliding relative to its cylinder.

Pistons 427d of the type shown in FIG. 13a can be produced in special injection molding machines wherein discrete first and second extruders furnish the first and second constituents of the plastic material. It goes without saying that such special injection molding machines can also serve as a means for producing casings such as those denoted by reference characters 410, 510 and 610 and respectively shown in FIGS. 7, 10 and 14; the casings may but need not be equipped with integrated guide sleeves. The arrangement can be such that the surfaces which are to be contacted by the lip seal are provided on a plastic material having a low coefficient of friction but the remaining part or parts of the casing can be made of a plastic material exhibiting a pronounced resistance to deformation.

Figure 14:
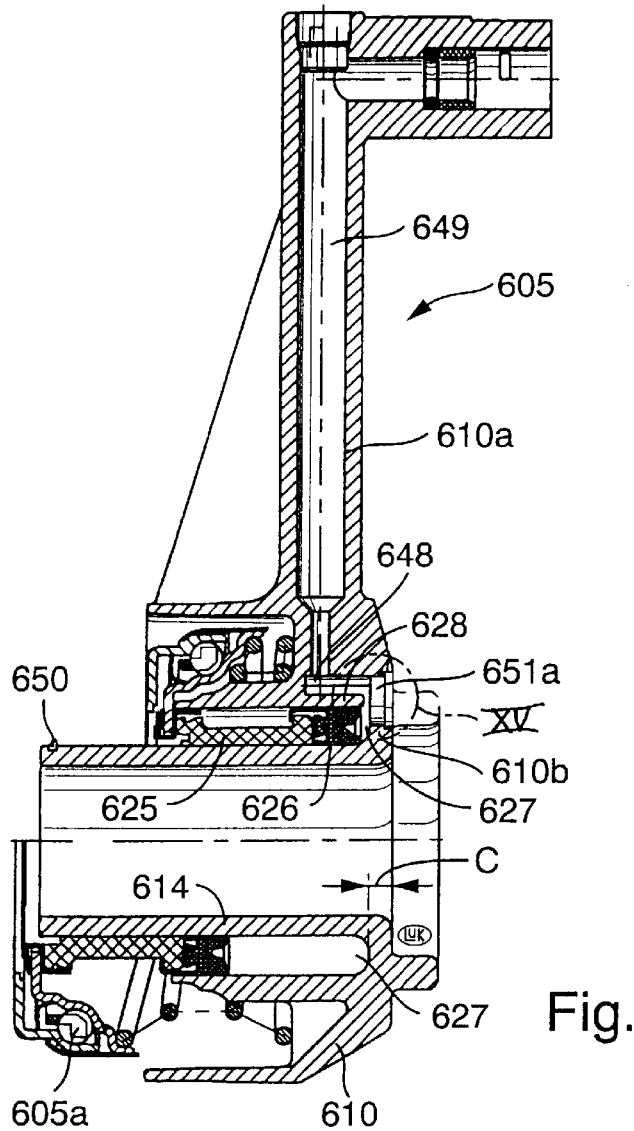
FIG. 14 is a sectional view of a further central clutch release system with the piston shown in two different axial positions.

FIG. 14 illustrates a central clutch disengaging or releasing device 605 having a plastic casing 610 of one piece with a conduit or pipe 610a preferably made of a synthetic plastic material in an injection molding machine. Such mode of making the casing 610 is relatively expensive; therefore, it might be advisable to employ a composite casing which is assembled of two or more discrete sections. This renders it possible to provide the casing 610 with the required channels (such as the mutually inclined communicating channels 649, 648 and with the chamber 627 which communicates with the fluid supplying channel 649 by way of the intermediate channel 648) by resorting to appropriate injection molding implements. It is presently preferred to assemble the casing of at least two discrete injection molded components which are produced separately and are thereupon assembled into the structure denoted by the reference character 610.

In accordance with a modification, the sleeve-like part 614 can be produced separately of the remainder of the casing 610 and is thereupon affixed to the casing 610, preferably in the region C shown in FIG. 14. This simplifies the making of the conduit 648 which merely necessitates the use of a core in the injection molding implement. The separately produced sleeve 614 and the remainder of the casing 610 are thereupon secured to each other by resorting to conventional welding, bonding and/or caulking procedures.

FIG. 14 further shows an annular piston 625 which is reciprocable in the annular plenum chamber 627 and carries a lip seal 626. The sleeve 614 and the remainder of the casing 610 are joined by a wall 610b bounding that end of the chamber 627 which is remote from the engine (not shown in FIG. 14). The channel 648 connecting the channel 649 with the chamber 627 communicates with an opening 651a in the wall 610b; such opening receives a core which forms part of the injection molding tool and is necessary in the course of the injection molding operation to form the channel 648. The opening 651a is closed by a component part in the form of a plug 651 shown in FIG. 15.

Figure 15:
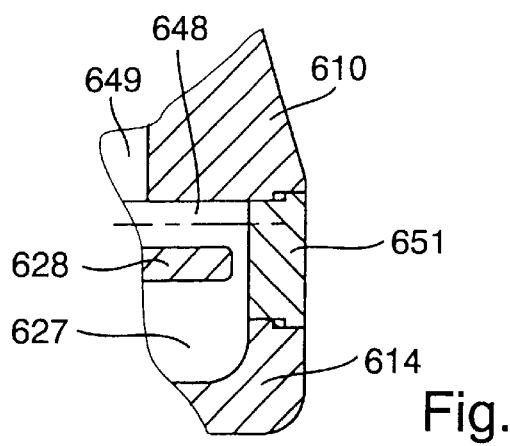
FIG. 15 is an enlarged view of the detail within the phantom-line circle XV in FIG. 14.

The detail within the circle XV in FIG. 14 is shown in FIG. 15 drawn to a larger scale. The casing 610 is of one piece with the guide sleeve 614 and is provided with the channel 649 discharging into the channel 648 which is parallel to the axis of the passage defined by the sleeve 614. The channel 648 is outwardly adjacent the external sealing surface 628 and communicates with the plenum chamber 627. Such one-piece casing 610 cannot be produced in a standard injection molding machine. Therefore, one must resort to an undertaking which involves the making in the casing 610 of an opening 651a as an axial extension of the channel 648, and such opening 651a is thereupon sealed by a plug 651 (FIG. 15), e.g., by resorting to ultrasonic welding, to an adhesive, to caulking, hot caulking or the like. It is also possible to employ between the plug 651 and the casing 610 a discrete sealing element, such as a sealing ring. The extension of the channel 648 projects radially inwardly and serves to convey pressurized fluid into the plenum chamber 627.

Referring again to FIG. 14, the provision of the channels 649, 648 which lead to the plenum chamber 627 exhibits the advantage that they contribute to a lengthening of the path for the piston 625 and for the lip seal 626 which is form-lockingly associated with the piston. This contributes to a pronounced increase of the overall space for travel of casing 610 and to a simultaneous reduction of space requirements of the entire clutch disengaging structure.

The channel 649 is disposed axially between the piston 625 and the channel 627. The partial axial guidance of the fluid supplying channel 648 around the radially outermost sealing surface 628 (see also FIG. 15) renders it possible to reduce the space requirements, as seen in the axial direction, and hence the overall length of the clutch release device 605. This, in turn, renders it possible to reduce the cost and the space requirements of the entire prime mover of the motor vehicle.

FIG. 14 further shows a radially outwardly extending stop 650 which replaces the stop 450 of the metallic sleeve 414 shown in FIG. 7 and is an integral part of (i.e., of one piece with) the casing 610. Thus, such stop 650 can be provided during the making of the casing 610 in an injection molding machine and can exhibit a certain amount of elasticity. The stop 650 can also serve as a safety enhancing component during transport of the casing 610 and it can constitute a circumferentially complete ring or an annular array of discrete sections. If the piston 625 (with the bearing 605a) and/or the lip seal 626 is to be mounted on or removed from the sleeve 614, the stop 650 or its sections undergoes or undergo temporary deformation to thereupon snap back to the position(s) shown in FIG. 14.

Figure 16:
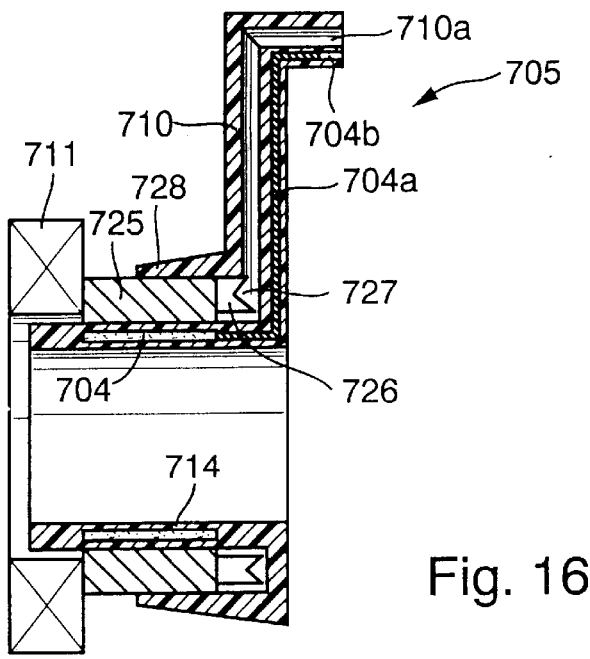
FIG. 16 is a fragmentary axial sectional view of a central clutch release device with a sensor built into its casing.

The central clutch release device 705 of FIG. 16 is designed for use in conjunction with automated clutches and/or automated change-speed transmissions and is integrally associated with a detector or sensor 704. The latter serves to monitor the extent of release movement of the relevant part or parts of the clutch. This sensor can be integrated into the casing 710 of the clutch release device 705 during making of the casing in an injection molding machine, for example (and as shown), in the region of the guide sleeve 714 or in the region of the outer sealing surface 728.

It is often desirable to provide the radially inner part of the sensor 704 with a metallic shell and to secure it, not unlike a metallic guide shell, at the inner circumference of the release device 705, e.g., by snap action, by resorting to an adhesive or in another suitable manner. The sensor 704 is sealed from the plenum chamber 727 and can include a metallic wall which cooperates with the lip seal 726 to enhance the sealing action. The conductor means 704a leading to and/or from the sensor 704 can be embedded in the injection molded plastic material of the casing of the central clutch release device 705. The terminals 704b of such conductor means are shown as being located at the inlet 710a which admits pressurized fluid into the elongated channel defined by the casing 710 and leading to the plenum chamber 726. The terminals 704b can be affixed to a plug (not shown) which enters a socket when the casing 710 is properly secured to a friction clutch. The plug for the terminals 704b can be disposed between the inlet 710a and an outlet (not shown) of a fluid evacuating conduit which is or can be disposed at the level of the inlet 710a.

The sensor 704 can include an electric coil which ascertains the axial movements of the piston 725 and release bearing 711 as a result of changes of an electrical value, e.g., of an electric or magnetic field which varies in response to axial displacement of the piston in its chamber 726. The piston 725 disengages the friction clutch (not shown in FIG. 16) by way of the release bearing 711 in a manner as already described hereinbefore. An advantageous signal evaluating procedure can involve an eddy current procedure, a process of measuring the inductance (and more specifically changes of inductance) in dependency upon the extent and/or direction of movement of the piston 725 and/or others.

Figure 17:
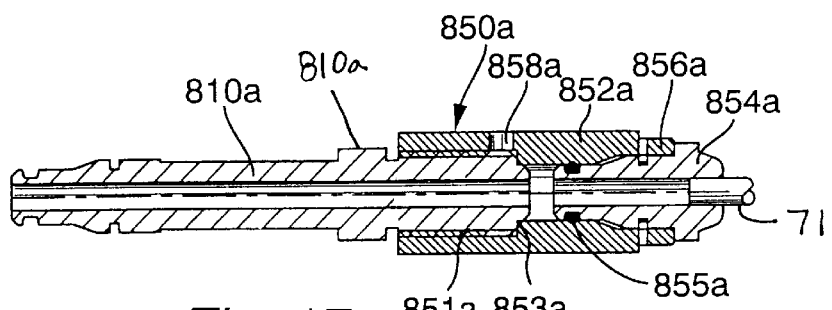
FIG. 17 is an axial sectional view of an adapter which can be utilized as a component of means for connecting a master cylinder unit with a slave cylinder unit in the power train capable of utilizing a central friction clutch release device of the present invention.
Figure 18:
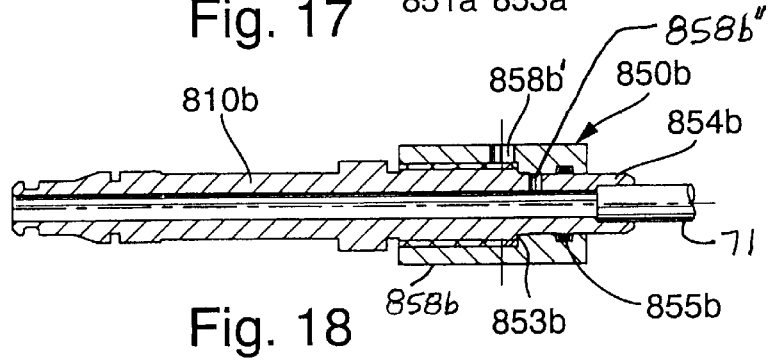
FIG. 18 is a similar sectional view of a modified adapter.
Figure 19:
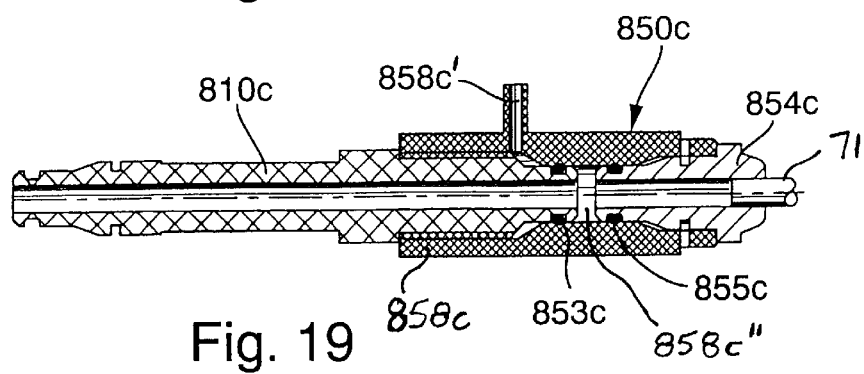
FIG. 19 is a similar sectional view of a third adapter.

FIGS. 17 to 19 illustrate three embodiments of an adapter which can couple the housing or cylinder of a master cylinder unit with the housing or casing or cylinder of a slave cylinder unit (such as that including the casing 710 shown in FIG. 16). Reference may be had, for example, to FIG. 1 wherein an adapter 71a is installed in the stationary outer housing or bell 2c to connect the plastic casing of the clutch release device 5 with the master cylinder 70 by way of the conduit 71. An adapter is particularly desirable and advantageous when the configuration of channels in the clutch housing must conform to that of the master cylinder and the conduit(s) which is or which are located outside of the clutch bell. Otherwise stated, an adapter can simplify the establishment of a connection between the casing of a clutch release device and the housing of a master cylinder with a minimum of modifications of mass-produced parts which serve to actuate a friction clutch in response to depression of a clutch pedal (72) or in response to activation of an actuator which can be utilized in conjunction with automated or automatic friction clutches, e.g., in the power train of a motor vehicle. The adapter can be installed in the bell 2c of FIG. 1 to connect the clutch release device 5 (which is confined in the bell) with the conduit 71 leading from the master cylinder unit 70 which latter is located outside of the bell.

Prior proposals include the utilization of angular adapters which are expensive and include housings that are forged, at least in part. As a rule, it is necessary to subject such conventional adapters to a treatment in at least two axial directions. On the other hand, the adapters 850a, 850b and 850c which are respectively shown in FIGS. 17, 18 and 19 are built linearly (i.e., they are straight) and, therefore, can be made and finished (treated) in a relatively simple manner and in a single axial direction. In addition, the weight of the adapter 850a, 850b or 850c can be a fraction of the weight of a conventional adapter.

The adapter 850a of FIG. 17 includes a housing 852a having an internal thread 851a mating with the external thread of a conduit 810a corresponding to the conduit 71 shown in FIG. 1, i.e., leading to the outlet 70e of the chamber 70d in the housing 70a of the master cylinder 70. The conduit 810a is configurated in such a way that it can extend through an opening in the bell 2c, i.e., into the interior of such bell. The conduit 810a has a hexagonal head 810a' so that it can be conveniently threaded into the housing 852a (at 851a). The reference character 853a denotes in FIG. 17 a sealing shoulder which is provided in the housing 852a and bears upon the adjacent annular shoulder at the right-hand end face of the conduit 810a. The conduit 810a and the housing 852a are or can be made of a metallic material. Sealing engagement at the shoulder 853a involves a plastic deformation of the part 810a and/or 852.

Surplus liquid can be evacuated from the path defined by the coaxial passages of the parts 810a, 852a by loosening the threaded connection at 851a to thus establish communication between the interior of the conduit 810a and a radial opening or port 858a of the housing 852a. Such possibility of aeration of the axially extending passages in the conduit 810a and the housing 852a constitutes an advantageous feature of the adapter 850a; this renders it possible to evacuate spent or surplus pressure fluid from the interior of the adapter 850a.

The character 854a denotes in FIG. 17 a nipple which facilitates coupling of the housing 852a to the outlet of the cylinder in a master cylinder unit which serves to supply pressurized fluid to the cylinder of the slave cylinder unit. A clamp 856a (or a set of such clamps) is provided on the housing 852a to couple the nipple 854a to such housing. The nipple 854a has a suitable socket or detent for each clamp 856a of the housing 852a. A sealing ring 855a is installed between the nipple 854a and the housing 852a.

The modified adapter 850b of FIG. 18 has a conduit 810b which is a straight piece of piping and is of one piece with the nipple 854b which is connectable directly to the outlet of the cylinder or housing of a master cylinder unit (such as the unit 70 shown in FIG. 1) or with a conduit 71 corresponding to the similarly referenced conduit shown in FIG. 1. The adapter 850b further comprises a box nut or union nut 858b which cooperates with a sealing ring to normally seal a port 858b' in the nut from the passage for the flow of hydraulic fluid between the coaxial passages in the parts 810b and 71. The annular sealing shoulder 853b is effective when the union nut 858b is tightened so that it seals a second port 858b' from the surrounding atmosphere. The port 858b' is provided in the nipple 854b and communicates with the port 858b when the union nut 858b is loosened so that the passage in the component parts 810b, 854b can communicate with the atmosphere. Part 855 is a sealing ring.

The adapter 850c of FIG. 19 is preferably made of a plastic material and operates without a sealing shoulder (such as 853a or 853b). The sealing member is replaced with sealing rings 853c, 855c which are recessed into the nipple 854c within the nut 858c. The latter is preferably made in an injection molding machine. The pipe 858c' replaces the part 858b' and cooperates with the port in one of the component parts 810c, 854c when the nut 858c is loosened.

A system which employs one of the adapters 850a (FIG. 17), 850b (FIG. 18) and 850c (FIG. 19) can be constructed and assembled and can operate as follows: The slave cylinder unit can consist of a plastic material or is diecast of aluminum or is produced in accordance with another suitable technique and is preferably part of a central clutch disengaging or release device. It is devoid of connectors to conduits but is equipped with a fluid supplying box which sealingly and fixedly receives the conduit 810a, 810b, 810c or an analogous component part leading to or constituting an element of the slave cylinder unit. The channel in the conduit (such as 810a) preferably communicates with an opening or with openings provided in conventional clutch disengaging systems without the need for a modification of such conventional systems. All that is necessary is to properly select the dimensions of that part or those parts of the adapter whose conduit (such as 810a) is to be received in the opening(s) of a conventional system. The conduit (such as 810a) of the improved adapter is fitted into the just discussed opening(s) of the conventional system and the nipple (such as 854a) is connected with the outlet of the master cylinder unit 70 or with the conduit 71. If the clutch release device which employs the improved adapter 850a, 850b or 850c does not have its own aerating arrangement, such function is performed by the parts including the port 858a, 858b' or 858c', i.e., the respective union nut is loosened to render the port 858a or 858b' or the pipe 858c' and port 858c" (FIG. 19) effective.

FIGS. 20a to 24b illustrate several embodiments of an aerating arrangement for a slave cylinder. The aerating arrangement is directly connected to the slave cylinder. FIGS. 20a, 21a, 22a, 23a and 24a show the respective aerating arrangements in operative positions, and the FIGS. 20b, 21b, 22b, 23b and 24b illustrate the corresponding aerating arrangements in those positions they assume when the respective clutch disengaging or release systems or devices are operative and no aeration is possible.

Figure 20A:
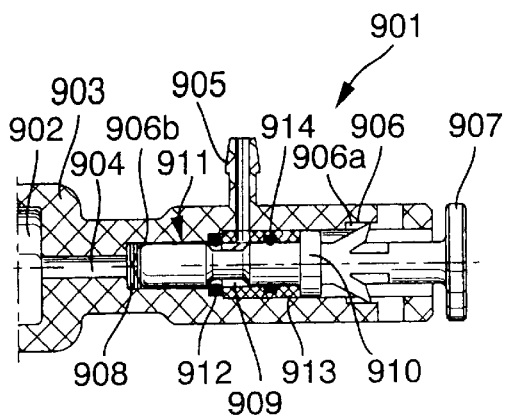
FIG. 20a is an axial sectional view of an aerating valve which can be utilized in conjunction with the central clutch release device or system of the present invention.

The aerating arrangement 901 of FIG. 20a includes a housing or case 903 preferably consisting of a synthetic plastic material and including a connector 902 which is to be attached to the cylinder or casing of the slave cylinder. The housing 903 further includes a fluid supplying channel 904 and a fluid discharging nipple 905. A stepped central hole 906 of the housing 903 receives a piston 907 which is movable axially against the opposition of an axially acting resilient element 908 here shown as a coil spring. The piston 907 is provided with a steering edge 909 and with a radially outwardly extending cylindrical guide 910 which is confined to axial movements in a larger-diameter portion 906a of the central hole 906. Another portion of the piston 907 is movable with clearance in a smaller-diameter portion 906b of the central hole so that the piston and the housing section surrounding the portion 906b define an annular passage or clearance 911 for the flow of fluid. When the piston 907 assumes the retracted position of FIG. 20b, the annular clearance 911 is sealed by a ring-shaped sealing element 912.

When the piston 907 assumes the aerating position of FIG. 20a, the fluid can flow through the clearance 911, along the steering edge 909 and on to the outlet (nipple) 905. A distancing element or stop 913 is provided to abut and stop the piston 907 in the aerating position of FIG. 20a; at such time, a further sealing ring 914 is active between the piston 907 and the distancing element 913. The piston 907 is not fixed in the aerating position of FIG. 20b and, therefore, must be maintained under pressure.

Figure 20B:
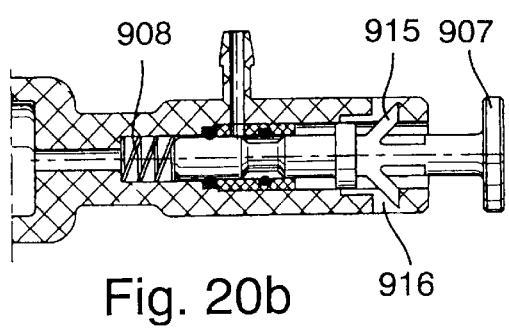
FIG. 20b illustrates the valve of FIG. 20a but with the piston-like valving element in a different axial position.

When in the operative position of FIG. 20b, the piston 907 is biased by the coil spring 908 so that its hook-shaped detent or detents 915 bears or bear upon one or more shoulders in a notch 916 or in several discrete notches of the housing 903.

Figure 21A:
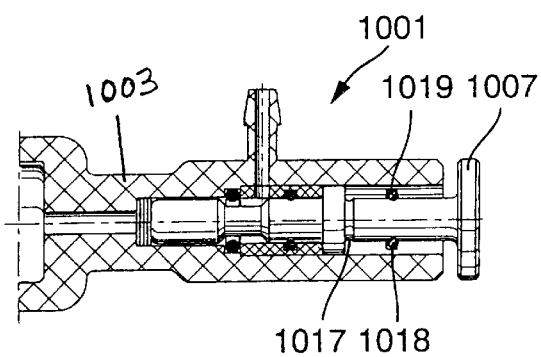
FIG. 21a is an axial sectional view of a second aerating valve.
Figure 21B:
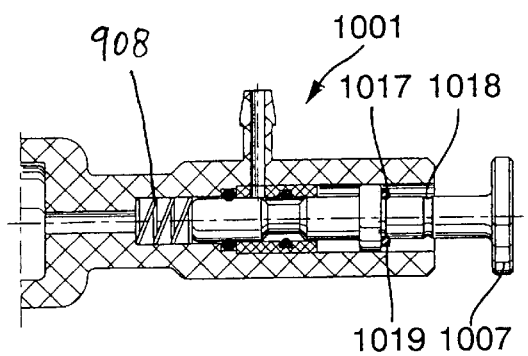
FIG. 21b illustrates the structure of FIG. 21a but with the piston-like valving element in a different axial position.

FIGS. 21a and 21b show an aerating device 1001 which is identical with the aerating device 901 with the exception of the detent arrangement for the piston 1007. The latter is provided with two notches 1017, 1018 either or which can receive a retaining clamp 1019 of or in the housing 1003. When the piston 1007 assumes the aerating position of FIG. 21a, the clamp 1019 extends into the notch 1018. This clamp extends into the notch 1017 in the operative position of the piston. It is not necessary to permanently bias the piston 1007 during aeration.

Figure 22A:
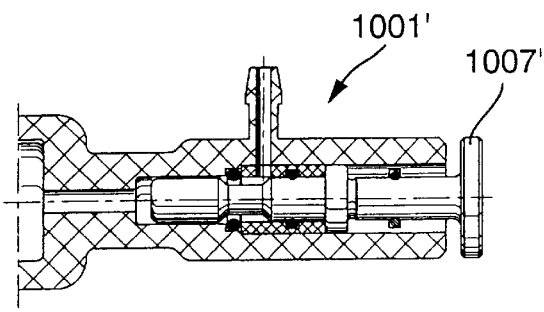
FIG. 22a is an axial sectional view of a third aerating valve which constitutes a modification of that shown in FIGS. 21a and 21b.
Figure 22B:
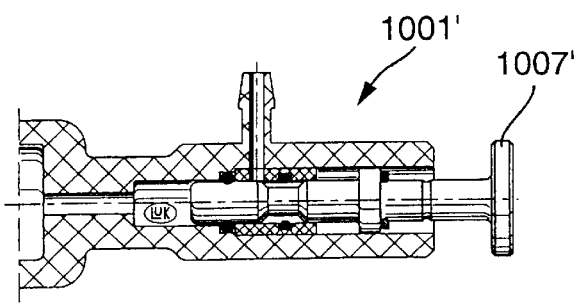
FIG. 22b illustrates the structure of FIG. 22a but with the piston-like valving element in a different axial position.

FIGS. 22a and 22b show an aerating device 1001' which is at least substantially identical with the aerating device 1001 of FIGS. 21a and 21b except that the energy storing device (corresponding to the coil spring 908 shown in FIGS. 20a to 21b) is omitted. The piston 1007' is or can be identical with the piston 1007 in the housing 1003 of FIGS. 21a and 21b.

Figure 23A:
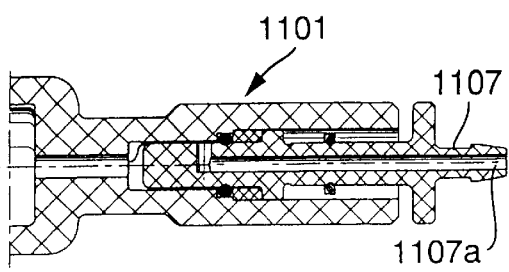
FIG. 23a is an axial sectional view of a fourth aerating valve.
Figure 23B:
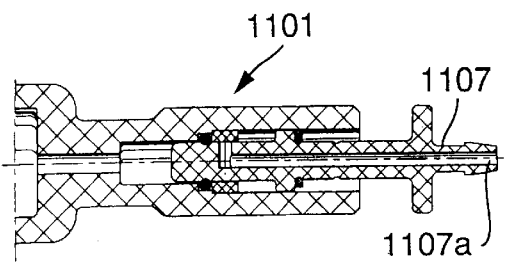
FIG. 23b shows the structure of FIG. 23a but with the piston-like valving element in a different axial position.

The aerating device 1101 of FIGS. 23a and 23b comprises a piston 1107 having an axial aerating passage 1107a which corresponds to that defined by the nipple 905 of FIGS. 20a and 20b.

Figure 24A:
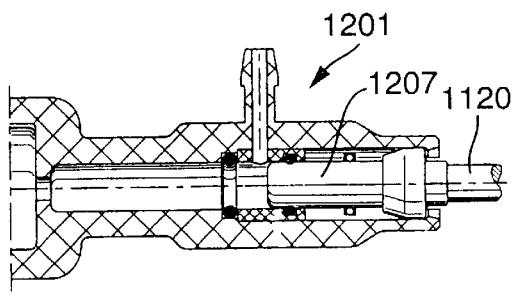
FIG. 24a is an axial sectional view of a fifth aerating valve.
Figure 24B:
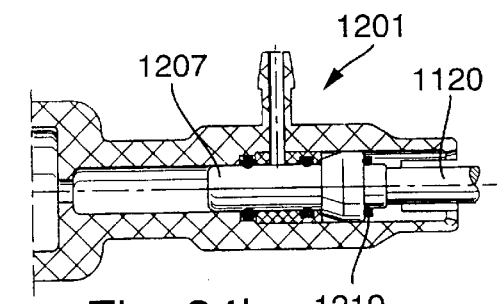
FIG. 24b illustrates the structure of FIG. 24a but with the piston-like valving element in a different axial position.

FIGS. 24a and 24b show an aerating arrangement 1201 for a slave cylinder which does not have a discrete aerating conduit. The piston 1207 is part of the conduit 1120 which supplies pressurized fluid from the master cylinder, not shown. A retaining clamp 1219 (corresponding to the part 1019 shown in FIGS. 21a and 21b) is provided to hold the piston 1207 (i.e., the conduit 1120) in either of the two axial positions determined by notches in the housing of the aerating arrangement 1201. Aeration takes place under the action of hydrostatic pressure. It is to be noted that the conduit 1120 is to be guided to the highest point of the plenum chamber in the slave cylinder.

Figure 25:
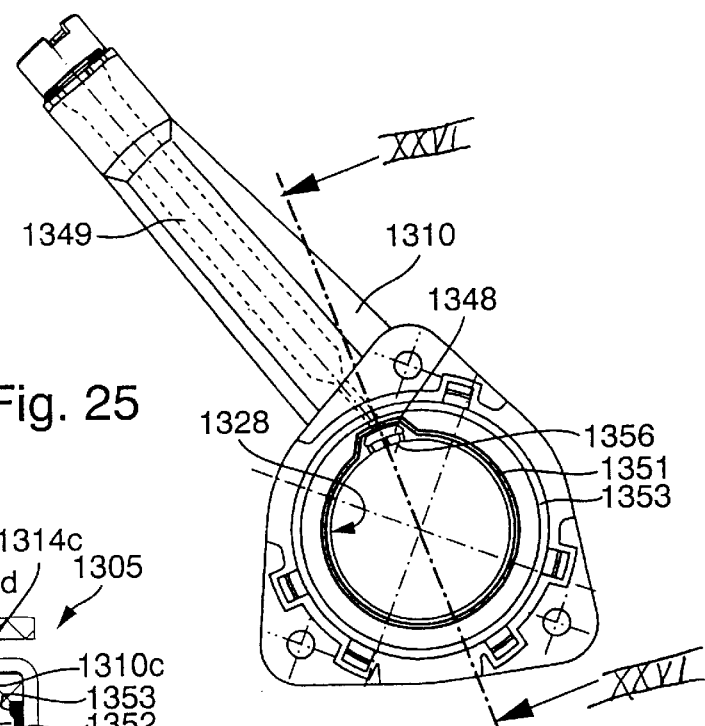
FIG. 25 is an end elevational view of still another central clutch release or disengaging device or system.
Figure 26:
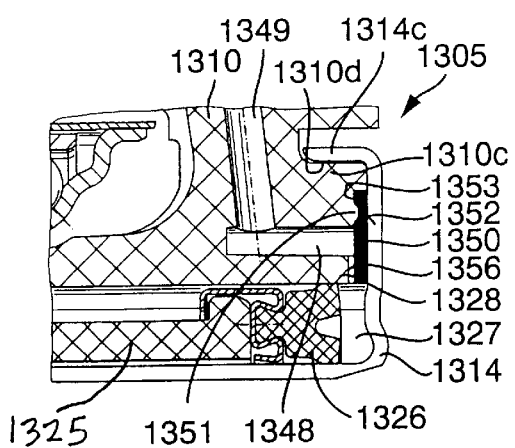
FIG. 26 is an enlarged fragmentary sectional view substantially as seen in the direction of arrows from the line XXVI—XXVI shown in FIG. 25.

FIG. 25 illustrates a plastic casing 1310 for a central clutch release device which constitutes or includes a slave cylinder in a hydraulic clutch actuating system, and FIG. 26 shows the complete central clutch release system 1305 in a cross-sectional view.

The casing 1310 is similar to the casing 110 in the central clutch disengaging or release device 105 shown in FIG. 3; it comprises a guide sleeve 1314 which is connected with the main portion of the plastic casing 1310 in a manner analogous to that already described in connection with FIG. 3. A difference exists in the manner of establishing a sealing engagement between the main portion of the plastic casing 1310 and the sleeve-like guide 1314; this modified sealing engagement can be used with advantage in any other slave cylinder or in many other slave cylinders having a corresponding guide sleeve. The sealing action is furnished by a flat sealing ring 1350, a substantially annular abutment surface 1353 in the casing 1310, and by an essentially plane engagement (at 1352) of the guide sleeve 1314. The abutment surface 1353 is coaxial with and surrounds the axis of the guide sleeve. The ring-shaped seal 1350 is recessed into the surface 1353 and is at least substantially aligned with the radially outer cylindrical wall 1328 in the plenum chamber 1327 which receives the piston 1325 and the lip seal 1326 which is affixed to the piston. The seal 1350 overlies an opening 1348 which is provided radially outwardly of the chamber 1327 and supplies fluid from the supply channel 1349 in the plastic casing 1310. The central clutch release device 1305 can be aerated by way of the channel 1349.

The connection between the opening 1348 and the plenum chamber 1327 is established by way of at least one but preferably two or more grooves 1356 extending axially between the abutment surface 1353 and the sealing ring 1350. The seal for the plenum chamber 1327, as well as for the supply channel 1349, from the atmosphere is established by an axially raised endless bead 1351 which is provided at the abutment surface 1353 of the casing 1310 and the smallest radius of which corresponds to that of the internal surface of the casing 1310. The bead 1351 is larger (as seen radially) only at the opening 1348 and extends around this opening. Such arrangement ensures that the pressure acting upon the sealing ring 1350 in the plenum chamber 1327 is much lower, i.e., the establishment of a seal between the sleeve-like guide 1314 and the casing 1310 presents fewer problems.

Another desirable feature, which can be of advantage in all slave cylinders having discrete guide sleeves, is that the guide sleeve 1314 is movable radially of the casing 1310. This results in the establishment of a clearance or play (at 1310d) between the guide sleeve 1314 and the radial abutment surfaces 1310c, 1314c respectively provided on the casing 1310 and on the guide sleeve 1314.

Figure 27:
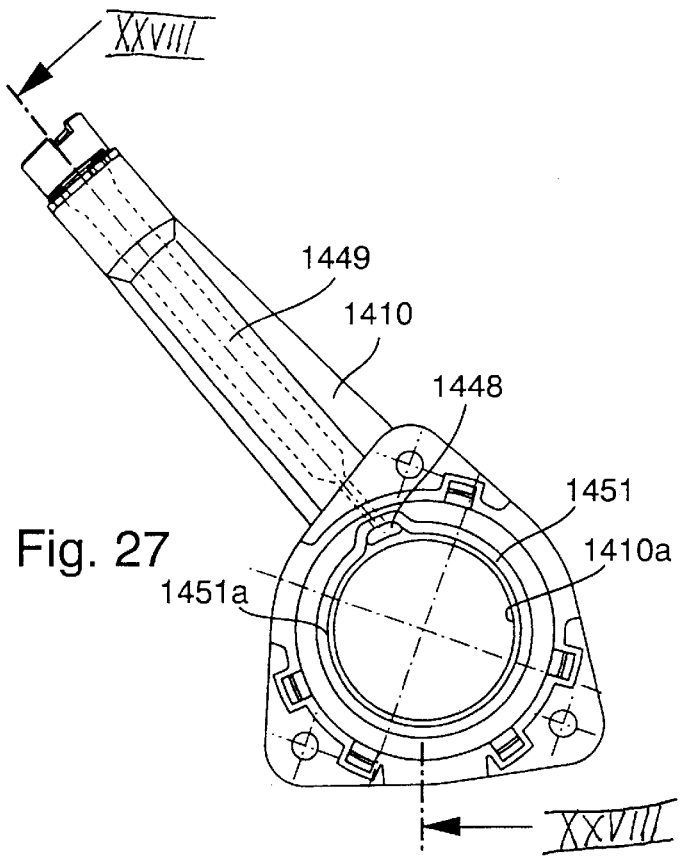
FIG. 27 is an end elevational view of a further clutch release device.
Figure 28:
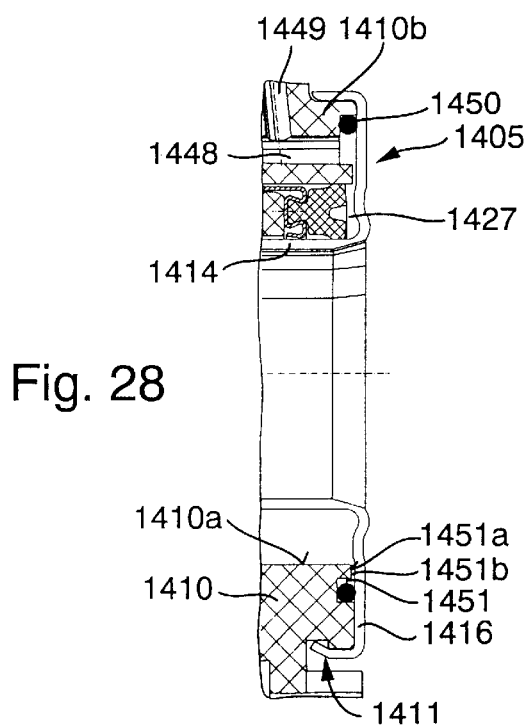
FIG. 28 is an enlarged fragmentary sectional view substantially as seen in the direction of arrows from the line XXVIII—XXVIII of FIG. 27.

Still another embodiment of a sealing arrangement between the casing 1410 of the central clutch release device 1405 and a guide sleeve 1414 is shown in FIGS. 27 and 28. With the exception of the seal between the guide sleeve 1414 and the casing 1410 and the establishment of a plenum chamber 1427, the structure shown in FIGS. 27 and 28 is or can be identical with that shown at 1305 and 1310 in FIGS. 25 and 26. The casing 1410 is provided with an axially extending groove 1451 which is adjacent the internal surface of the casing 1410 (as seen in the radial direction of the guide sleeve 1414). A sealing rib 1451a is provided between the internal surface 1410a and the groove 1451a. The sealing ring 1451 is expanded and surrounds the discharge opening 1448 at the end of the passage 1449. The groove 1451 receives a standard O-ring 1450 which establishes a seal between the casing 1410 and the guide sleeve 1414. It is often of advantage to make the groove 1451 wider (as seen in the radial direction of the guide sleeve 1414) than necessary for insertion of the O-ring 1450 and to remove the entire sealing rib 1451a at a specific location or at several locations or to remove segments of such sealing rib (as seen in the circumferential direction of the internal surface 1410a). This results in the establishment of an accurately defined clearance 1415b which is disposed between the casing 1410 and the guide sleeve 1414 and provides a path for the flow of hydraulic fluid to and from the passage 1449. The dimensions of the clearance 1451b are or can be selected in such a way that the extent of compression of the O-ring 1450 as a result of engagement of the casing 1410 with the guide sleeve 1414, and hence a change of such clearance, are negligible or insignificant.

The guide sleeve 1414 is fastened and centered by an axial extension 1410b of the casing 1410. To this end, the guide sleeve 1414 is deformed in the axial direction at the periphery of the radial marginal zone 1416 and toward the passage 1449, and is secured to the extension 1410b by a self-locking device 1411 which can constitute a snap fastener and/or can include an array of rivets, threaded fasteners, a bayonet mount or the like to hold the guide sleeve 1414 against any or against any undesired axial and/or angular movements.

Figure 29:
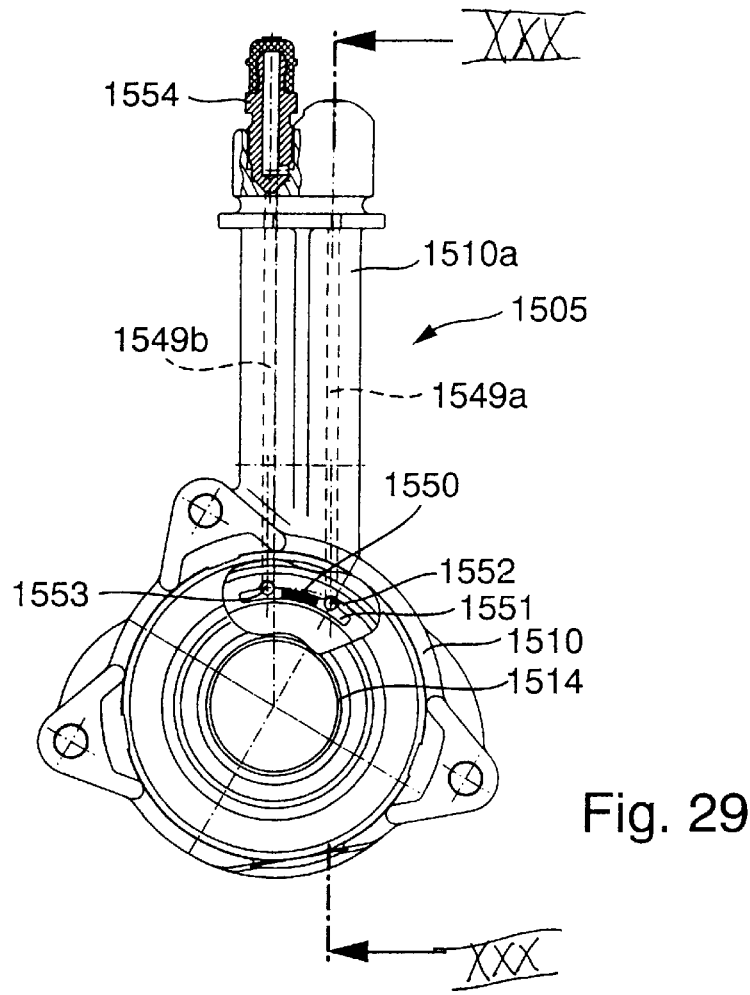
FIG. 29 is a partly end elevational and partly sectional view of an additional clutch release or disengaging device.
Figure 30:
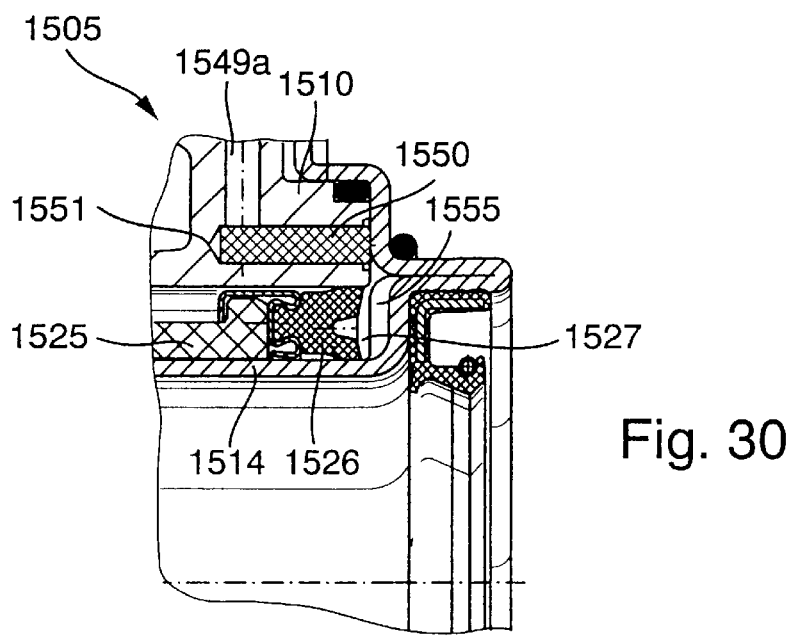
FIG. 30 is an enlarged fragmentary axial sectional view substantially as seen in the direction of arrows from the line XXX—XXX in FIG. 29.

FIGS. 29 and 30 show a further embodiment of a central clutch release device 1505 which can constitute or include a slave cylinder. The characters 1552, 1553 denote the outlets of two channels 1549a, 1549b which are provided in the preferably plastic casing 1510, and more specifically in a pipe-like extension 1510a which can form part of or is affixed to the casing 1510. The channel 1549a serves to convey pressurized hydraulic fluid, and the channel 1549b is a fluid evacuating channel. The piston 1525 is reciprocable in the plenum chamber 1527 between the external surface of the guide sleeve 1514 and the internal surface of the adjacent cylindrical internal portion of the casing 1510. The piston 1525 is reciprocable with the lip seal 1526, and this lip seal engages the internal surface of the radially innermost portion of the casing 1510 as well as the external surface of the guide sleeve 1514.

The outlets 1552, 1553 of the channels 1549a, 1549b communicate with a common chamber or compartment 1551 located radially of and communicating with the plenum chamber 1527. The outlets 1552, 1553 are segregated from each other by a barrier 1550 which is received in the compartment 1551 and at least substantially seals the channels 1549a, 1549b from each other. When the channel 1549b is free to evacuate fluid from the chamber 1527 by way of an opened or loosened aerating screw, such fluid flows from the channel 1549a and through the plenum chamber 1527 into the evacuating channel 1549b to be flushed out of the chamber 1527 when necessary. Such arrangement also permits for evacuation of air bubbles and/or for more effective evacuation of aged hydraulic fluid (if any) from the plenum chamber 1527.

The barrier 1550 can be retroactively fitted into certain existing types of slave cylinders and can be made of any one of a great variety of different materials, e.g., an elastic material (such as rubber or EPDM) or a plastic or metallic or other suitable part which conforms to the compartment 1551 to establish a seal between the outlets 1552, 1553. It is also possible to form the barrier 1550 during making of the casing 1510, e.g., in an injection molding machine. It is equally possible to provide the barrier 1550 with one or more holes which open in response to the application of elevated pressures, e.g., while the release device is in the process of disengaging the friction clutch, so that fluid can flow between the outlets 1552 and 1553. This excludes the undesirable influence of hysteresis and the like. When the pressure in the compartment 1551 drops, such apertured barrier can at least substantially seal the channels 1549a, 1549b from each other.

The flow of pressurized fluid from the compartment 1551 into the chamber 1527 can be optimized by providing the guide sleeve 1514 with a radially outwardly and thereupon axially extending profile 1555. Such profile can be provided with grooves associated with the channels 1549a, 1549b or it can be provided with additional or discrete grooves which are distributed in the circumferential direction. The just described designs of axial profiles can be resorted to with advantage in conjunction with all or practically all or many slave cylinders having guide sleeves and channels leading to a plenum chamber adjacent the guide sleeve. Such design entails savings in space (as seen in the axial direction of the guide sleeve), allows for more satisfactory supplying of pressurized fluid, as well as numerous additional important advantages.

The entire disclosures of published German patent applications Nos. 198 49 850.0 and 198 16 255 are incorporated herein by reference.

The improved clutch operating arrangement is susceptible of numerous additional modifications without departing from the spirit of the present invention. For example, and referring again to FIG. 4, the openings 212 can constitute tapped bores and the pins 213 can constitute or include externally threaded parts which serve to secure the casing 210 to the transmission case 209. Such fasteners can be provided with washer-like laminations 213a which contribute to retention of the casing 210 in an optimum position relative to the transmission case. The pins 213 and the laminations 213a can also serve as a means for centering the casing 210 relative to the transmission case 209. The marginal portions of the washer-like laminations 213a can be provided with radial cutouts or slots to facilitate their deformation during introduction of the pins 213 into the respective openings or apertures 212. It is also possible to provide the openings 212 in the casing 210 and to mount the pins 213 on the transmission case. Still further, each of the parts 209, 210 can be provided with openings as well as with pins. The pins are preferably equidistant from each other (as seen circumferentially of the casing 210) and can serve to hold the parts 209, 210 against angular and axial movement relative to each other as well as to center the casing of the slave cylinder relative to the transmission case.

The openings 212 can receive reinforcing sleeves which, in turn, receive the pins 213 or their equivalents. The openings and the reinforcing sleeves can be provided on the casing 210 or on the radial extension (such as 315) of the sleeve (314), and the pins or their equivalents are then used to secure the casing of the slave cylinder to the transmission case by way of the radial extension of the sleeve.

The guide sleeve (such as the sleeve 114 shown in FIG. 3) can serve to center the casing (110) relative to the transmission case (109) and can be provided with means (such as a bayonet mount of the type shown in FIG. 6) for separably coupling the casing to the transmission case as well as for centering the casing relative to the transmission case. The sleeve 114 can directly surround the input shaft (shown at 8 in FIG. 1) of the transmission (2b).

The parts of the bayonet mount shown in FIG. 6 can be finished prior to attachment of the guide sleeve 314 to the casing 310; alternatively, certain parts of such bayonet mount or an equivalent thereof can be obtained by deforming the radial extension 318 and/or the retaining member(s) 320 subsequent to introduction of the portion 316 into the groove 317. The seal 319 can constitute an O-ring, a flat annular seal, a liquid seal or a so-called flow seal. The latter can consist of a solidified flowable substance which is received in an annular groove (shown in FIG. 6) of the casing 310. The solidified flowable substance can include or consist of silicon rubber and/or a silicon resin. Such seal is disposed radially outwardly of the plenum chamber in the casing 310. The latter is provided with at least one inlet for admission of flowable substance of the flow seal into the recess or groove for reception of the flow seal. The seal 431 and/or 432a in FIG. 7 can also constitute a flow seal. The flow seal or seals can be provided in one or more recesses or grooves of the casing and/or of the guide sleeve.

At least one of the seals between the casing of the slave cylinder and the guide sleeve can also serve to seal the conduit or conduits (such as 71) which admits or admit pressurized fluid into the plenum chamber of the slave cylinder. The seal or seals between the casing of the slave cylinder and the guide sleeve(s) need not be round (round seals are known in the art) but can have a maximum radius which corresponds to the smallest radius of the guide sleeve and a minimal radius equal to or exceeding that of the conduit 71 or an equivalent thereof.

It is also possible to employ a flat annular seal which has a circular shape and the mounting and the radial dimensions of which are such that it is coaxial with the guide sleeve, the seal and/or the casing can have openings which enable pressurized fluid to flow from the master cylinder into the plenum chamber of the slave cylinder.

A flat ring-shaped seal can be provided with an axially projecting annular bead which is outwardly adjacent the guide sleeve and surrounds the outlet of the conduit 71 (or of an equivalent or a portion, such as an adapter, of the conduit). When the guide sleeve is attached to the transmission case, the bead is deformed and performs a reliable sealing action.

Referring again to FIG. 7, the stop 451 can serve as an abutment for the annular piston 425 and/or for the annular clutch release bearing 451. If this stop is slotted axially (see FIGS. 7a and 7b), it exhibits several tongues (such as 452a or 452b) which can extend only radially and axially (FIG. 7b) or radially as well as circumferentially (FIG. 7a) of the guide sleeve. Such tongues can be formed during the making of the guide sleeve 414, especially if the latter is made of a plastic material (see FIG. 14). The stop can be an integral part of a slave cylinder housing which includes a casing 610, a guide sleeve 614 and preferably also a fluid supplying conduit 610a.

One or more metallic guide sleeves (reference may be had again to FIG. 8) are often preferred to plastic sleeves which are of one piece with the casing of the slave cylinder because such separately produced sleeve or sleeves contributes or contribute to stability of the slave cylinder, especially along the path for the reciprocable piston (425). Moreover, the sleeve or sleeves contributes or contribute to a reduction of friction between the internal and external surfaces of the annular piston on the one hand, and the adjacent surfaces (428, 429) of the metallic guide sleeves on the other hand.

A presently preferred material for the separately produced guide sleeve(s) is steel as well as certain other metals (such as aluminum) and/or alloys which exhibit satisfactory characteristic regarding frictional engagement with the piston and/or the deposition of layers or films which could interfere with or enhance reciprocatory movements of the piston in the annular chamber of the slave cylinder. It is also possible to make the guide sleeve(s) of a metallic material which is capable of forming and/or retaining a particular layer or film. Such guide sleeve(s) can be made of aluminum, magnesium and/or their alloys which can produce an oxide layer and contribute to desirable or optimal frictional engagement with the piston. The oxide layer(s) can be caused to develop on purpose.

Certain other substances which can be utilized for the making of satisfactory guide sleeve(s) include titanium, chromium or chromium-containing metals or alloys. Still further, the guide sleeve(s) can be imparted certain desirable characteristics (especially as far as its or their frictional engagement with the piston and/or with the lip seal is concerned) by ensuring that its or their piston-contacting surfaces are not treated (such as polished) to a high degree of smoothness. Thus, those portions of surfaces of the guide sleeves which come in contact with the reciprocable lip seal can be imparted a macrostructure which is required to accept and retain a film or layer capable of reducing the friction coefficient or establishing a desired or desirable friction coefficient between the guide sleeve(s) and the lip seal. Such film or layer can consist of grease and/or of modifications of carbon (such as graphite). Suitable graphites for the application to the piston-contacting guide sleeve(s) are highly condensed graphites known as glossy carbon and DL (diamond-like carbon).

Smoothness of the surfaces coming in contact with the piston and/or clutch-actuating bearing and/or lip seal can be increased to a desired optimum value during making of the casing of the slave cylinder. This can be achieved by resorting to the aforementioned monosandwich process which can be resorted to in connection with the making of the casing in an injection molding machine. To this end, the machine is equipped with a discrete second extruder which admits to the primary plastic material (such as a thermoplastic or thermosetting substance) a second plastic material the specific purpose of which is to impart predetermined characteristics to those portions of the casing which come in contact with the reciprocatory lip seal. The second plastic material adheres to the exterior of that part of the casing which is made of the first or primary plastic material but the second plastic material need not mix with the first plastic material. The second plastic material can consist of a polymer of a fluorohydrocarbon (such as PTFE, PFA, DVDF and the like) or of other hard plastic materials (such as PEEK, POM, PBT, PES and the like) which can be provided with a hard and smooth lip seal-contacting surface.

The plastic casing of the slave cylinder can be reinforced by fibers, such as glass fibers. The fibers need not be present in the region of contact with the lip seal, i.e., the aforementioned first or primary plastic material can be reinforced by fibers but the second or secondary plastic material (which comes in contact with the lip seal) need not contain any fibrous reinforcing material.

The radially outer guide sleeve (such as the one shown at 430 in FIG. 8) can be provided with a radial rim which is remote from the clutch bearing 451 and abuts an adjacent surface of the casing 410 or a part which is affixed to the casing. The sleeve is then held against-axial movement relative to the casing 410. A seal can be interposed between the thus modified metallic sleeve 430 and the casing 410. It is also possible to fixedly secure the outer guide sleeve 430 to the casing 410 by resorting to welding, to an adhesive or to a mechanical connection such as one or more detents, snap fasteners or the like.

The connection (such as that including the conduit 71 shown in FIG. 1) between the master cylinder (70) and the plenum chamber in the plastic casing of the slave cylinder can be selected in such a way that its axial length is reduced to a minimum. This can be achieved by resorting to an adapter of the type shown in FIG. 17, 18 or 19 wherein the nipple (e.g., the nipple 854) is connected to the conduit 71 and the adapter can extend through an opening in the bell 2c for attachment to the axially spaced-apart casing of the slave cylinder. The adapter ensures that the position and/or orientation of the casing of the slave cylinder need not conform or need not appreciably conform to the position of the opening in the bell 2c.

The casing of the slave cylinder can be assembled of two or more parts or sections if it cannot be made of one piece due to limitations of available injection molding machines, e.g., if the casing must be provided with undercut portions which prevent the removal of such casing from the form or mold in an injection molding machine. Such casing can be provided with a plug 651 of the type shown in FIG. 15, and the plug is thereupon secured to the casing (610) by resorting to an adhesive, by welding, ultrasonic welding, by male and female threads, by caulking, by press fitting, by snap fasteners or the like. A seal can be interposed between the casing and the plug.

The sensor 704 of FIG. 16 can transmit signals (via conductor means 704a) to a control circuit in the power train of the motor vehicle. The control circuit evaluates the information furnished by the conductor means 704a to thus ascertain the position of the piston 725. The sensor 704 can constitute an inductive displacement transducer, a Hall generator or the like.

Friction between the piston and/or the lip seal on the one hand, and the casing of the slave cylinder on the other hand can be reduced to or maintained at an optimum value by resorting to the aforesaid monosandwich undertaking or by utilizing for the casing a plastic material having a least one component which contributes to a reduction of sliding friction between the piston and/or the lip seal on the one hand, and the casing of the slave cylinder on the other hand. The component can consist of or include graphite and/or a polyfluorohydrocarbon (such as PTFE). As already mentioned above, this component can constitute between about 5% and 20% (preferably between about 8% and 15%) by weight of the weight of the casing of the slave cylinder. A highly satisfactory casing contains between about 35% and 75% by weight of a plastic material including a thermoplastic or a thermosetting substance, between about 20% and 45% of fibrous reinforcing material (such as glass fibers), and between about 5% and 20% of the aforediscussed component.

Furthermore, and in order to reduce the amount of work involved in the making and hence the cost of the slave cylinder, as well as for ecological reasons and for the convenience of assembly and dismantling (i.e., manipulation), it is normally advisable to apply special coatings to, and to thus influence the friction between the piston and/or the lap seal on the one hand, and the plastic casing on the other hand, those portions of the casing or guide sleeve(s) which come into direct sliding contact with the lip seal. The coating operation can involve the application of a film of nickel, chromium or the like.

A suitable method of applying films of nickel, chromium or the like can involve the assembly of a stack of superimposed casings with or without guide sleeves, to establish seals between neighboring casings to thus obtain a duct bounded by surfaces which require coating, and to thereupon apply the coating substance (such as a solution) which is required to complete a chemical or electrolytic coating of the surfaces by pouring the substance into the duct.

The various steps, combinations of steps, machines and/or apparatus and/or tools for carrying out the steps and/or combinations of steps and substances including the plastic and/or metallic substances can be utilized individually as well as in any suitable combinations in addition to and/or in lieu of those shown in the drawing and described hereinbefore. Furthermore, the hereinbefore described hydraulic operating arrangement can be utilized in conjunction with a variety of known friction clutches, master cylinders and other constituents of power trains in motor vehicles. Those embodiments which are described and claimed but not shown in full detail will be readily understood by those adequately skilled in the art pertaining to the power trains of motor vehicles, and more particularly in the art pertaining to the operating arrangements for the friction clutches of motor vehicles, upon perusal of the aforediscussed illustrated clutch operating arrangements as well as of those shown and described in the prior art identified in the specification of the present application.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of hydraulic operating arrangements for clutches and the like and, therefore, such adaptations should and are intended to be comprehended within the meaning and range of equivalence of the appended claims.

What is claimed is:

1. A system for altering the bias of a clutch spring in and for thus changing the condition of an engageable and disengageable friction clutch between a rotary output element of a prime mover and a rotary input element of a change-speed transmission having a composite transmission housing and being disposed in the power train of a motor vehicle, comprising:

a primary unit having an output;
means for actuating said primary unit to thus transmit a pulse by way of said output;
a clutch release device having an at least partially plastic composite casing and a mobile bearing coaxial with said input element and arranged to alter the bias of said clutch spring in response to movement axially of said input element; and
means for operatively connecting said output with said device to move said bearing axially of said input element in response to actuation of said primary unit to transmit a pulse by way of said output;
wherein said device is coupled to said transmission housing in a place that is axially opposite said bearing, the coupling of said device to said housing being effected by a direct engagement between said plastic composite casing and said housing.

2. The system of claim 1, wherein said actuating means comprises a driver-operated pedal in the motor vehical.

3. The system of claim 1, wherein said coupling comprises a self-locking arrangement.

4. The system of claim 1, wherein said primary unit includes a first hydraulic cylinder and piston unit and said output includes an outlet of the cylinder of said first unit, said casing including a cylinder of a second hydraulic cylinder and piston unit having a mobile piston operatively connected with said bearing and being reciprocable in said casing, said actuating means including a conduit connecting said outlet of said cylinder of said first unit with the cylinder of said second unit.

5. The system of claim 1, wherein said coupling comprises complementary first and second coupling members form-lockingly connected to each other and respectively provided on said housing and said casing.

6. The system of claim 5, wherein said second coupling member is of one piece with said casing.

7. The system of claim 6, wherein said casing is an injection molded part.

8. The system of claim 6, wherein said second coupling members has a shape imparted thereto exclusively by injection molding.

9. The system of claim 1, wherein said coupling includes at least one snap fastener.

10. The system of claim 9, wherein said housing is coaxial with said casing and said snap fastener includes at least one hook provided on one of said housing and said casing and at least one opening receiving said at least one hook and provided in the other of said housing and said casing against axial movement relative to said housing.

11. The system of claim 9, wherein said casing is coaxial with said housing and said at least one snap fastener comprises an annular array of male fastening elements provided on one of said casing and said housing and at least one female fastener provided in the other of said casing and said housing and receiving said male fastening elements.

12. The system of claim 11, wherein said at least one female fastener has an annular array of openings, at least one for each of said male fastening elements.

13. The system of claim 1, wherein said casing includes a cylinder and said device further comprises an annular piston provided in said cylinder and arranged to move said bearing relative to said input element.

14. The system of claim 13, wherein said piston and said bearing surround said input element.

15. The system of claim 1, wherein the coupling comprise an axial extension provided on the transmission housing with a radially inwardly extending circumferentially segmented profile; and a wherein the casing of the clutch release device has an enlarged portion projecting radially outwardly of and internally overlying at least a portion of and engaging said extension by snap action to thus secure the casing to the transmission housing as seen radially and axially of said extension.

16. The system of claim 1 wherein the system is hydraulically operated and the primary unit comprises a master cylinder unit, wherein the clutch release device comprises a slave cylinder composite casing consists at least in part of a plastic material, wherein the clutch release device further comprises an annular piston reciprocable in an annular plenum chamber of said casing, said casing including at least two sections to facilitate sealing of said chamber from the atmosphere; and wherein the system further comprises means for conveying pressurized hydraulic fluid from said master cylinder unit into said chamber including at least one extension provided on said casing.

17. The system of claim 16, wherein said extension includes a pipe having at least one channel for delivery of pressurized fluid from said master cylinder unit into said chamber, said casing being of one piece with said pipe and said pipe as well as said casing consisting of a plastic material, and further comprising a bell confining the friction clutch and said slave cylinder unit, said pipe extending from said master cylinder unit through and into said bell.

18. The system of claim 16, wherein said extension includes a nipple and a conduit coaxial with and communicatively connecting said nipple with said chamber, said casing further having a wall adjacent an end of said chamber and having an opening for the flow of fluid from said conduit into said chamber.

19. The system of claim 16,
wherein the means for conveying fluid include an aerating device with at least one sealable port for evacuation of fluid from said chamber.

20. The system of claim 16, wherein said fluid conveying means include an adapter separably connected with at least one of said units.

* * * * *